(12) United States Patent
Howes et al.

(10) Patent No.: US 9,970,715 B2
(45) Date of Patent: May 15, 2018

(54) THERMAL ENERGY STORAGE APPARATUS

(71) Applicant: Energy Technologies Institute LLP, Loughborough, Leicestershire (GB)

(72) Inventors: Jonathan Sebastian Howes, Hampshire (GB); James Macnaghten, Hampshire (GB); Rowland Geoffrey Hunt, Hampshire (GB); Robert Geoffrey Bennett, Hampshire (GB); Alexander Bruce Wilson, Hampshire (GB)

(73) Assignee: ENERGY TECHNOLOGIES INSTITUTE LLP, Leicestershire (GB)

( * ) Notice: Subject to any disclaimer, the term of this patent is extended or adjusted under 35 U.S.C. 154(b) by 682 days.

(21) Appl. No.: 14/396,129

(22) PCT Filed: Mar. 14, 2013

(86) PCT No.: PCT/GB2013/050628
§ 371 (c)(1),
(2) Date: Oct. 22, 2014

(87) PCT Pub. No.: WO2013/160650
PCT Pub. Date: Oct. 31, 2013

(65) Prior Publication Data
US 2015/0114591 A1 Apr. 30, 2015

(30) Foreign Application Priority Data
Apr. 23, 2012 (GB) .................. 1207114.8

(51) Int. Cl.
*F28D 17/02* (2006.01)
*F28D 20/00* (2006.01)

(52) U.S. Cl.
CPC ......... *F28D 20/0056* (2013.01); *F28D 17/02* (2013.01); *F28D 2020/0065* (2013.01); *Y02E 60/142* (2013.01)

(58) Field of Classification Search
CPC ....... F28D 2020/0021; F28D 2020/007; F28D 2020/0095; F28D 2020/0069; F28D 2020/0086; F28D 17/02; F28D 20/0056
(Continued)

(56) References Cited

U.S. PATENT DOCUMENTS 3,977,197 A 8/1976 Brantley, Jr.
4,114,600 A 9/1978 Newton
(Continued)

FOREIGN PATENT DOCUMENTS

CN 1589388 3/2005
CN 1963771 5/2007
(Continued)

OTHER PUBLICATIONS

Office Action in corresponding Japanese Patent Application No. 2015-507589 with English translation, dated Feb. 1, 2017, 8 pages.
(Continued)

*Primary Examiner* — Devon Russell
(74) *Attorney, Agent, or Firm* — Kenealy Vaidya LLP

(57) ABSTRACT

A thermal energy store comprising a chamber having a gas inlet and a gas outlet and a plurality of successive, downstream, gas permeable thermal storage layers disposed between them, each layer comprising gas permeable thermal storage media, the store being configured for gas flow from the gas inlet to gas outlet through the layers for transfer of thermal energy to or from the thermal storage media, wherein at least one of the layers is a valved layer provided with at least one valve operable selectively to allow or prevent at least some gas flow through that layer via the valve so as to bypass the thermal storage media. A control system may selectively alter the flow path of the gas flowing from inlet to outlet in response to the progress of a thermal front, so as to bypass thermal storage layers upstream of the
(Continued)

thermal front, where transfer is complete, or downstream thereof, where transfer is minimal.

20 Claims, 27 Drawing Sheets

(58) Field of Classification Search
USPC .......................................................... 165/10
See application file for complete search history.

(56) References Cited

U.S. PATENT DOCUMENTS

| | | | | |
|---|---|---|---|---|
| 4,291,750 | A | * | 9/1981 | Clyne ..................... F28D 20/02 126/641 |
| 4,405,010 | A | * | 9/1983 | Schwartz ............ F28D 20/0056 165/10 |
| 4,524,756 | A | | 6/1985 | Laverman |
| 5,615,738 | A | * | 4/1997 | Cameron .................. F28F 9/22 165/103 |
| 8,656,712 | B2 | * | 2/2014 | Howes ...................... F01K 3/12 60/515 |
| 2004/0194908 | A1 | | 10/2004 | Tomohide |
| 2007/0029064 | A1 | | 2/2007 | Baginski et al. |
| 2008/0066736 | A1 | * | 3/2008 | Zhu ......................... F03G 6/005 126/620 |
| 2010/0287933 | A1 | * | 11/2010 | Niknafs ..................... F24J 2/34 60/641.8 |
| 2010/0301614 | A1 | * | 12/2010 | Ruer ......................... F01K 3/12 290/1 A |
| 2012/0018116 | A1 | * | 1/2012 | Mathur .................. C09K 5/063 165/10 |
| 2012/0279679 | A1 | * | 11/2012 | Soukhojak ......... B60H 1/00492 165/10 |
| 2015/0253084 | A1 | * | 9/2015 | Beck ................... F28D 20/0056 165/10 |

FOREIGN PATENT DOCUMENTS

| | | | |
|---|---|---|---|
| CN | 101896748 | | 11/2010 |
| DE | 3444117 | | 5/1985 |
| DE | 10005937 | | 8/2001 |
| DE | 202011105364 U1 | * | 10/2011 ............. C09K 5/063 |
| DE | 202011105364 | | 12/2011 |
| EP | 1431694 | | 6/2004 |
| EP | 1857614 B1 | | 3/2010 |
| EP | 2574757 A1 | | 4/2013 |
| EP | 2574757 B1 | | 2/2014 |
| ES | 2374891 | | 2/2012 |
| JP | H0214575 | | 1/1990 |
| JP | 07071888 | | 3/1995 |
| JP | 2002-039694 | | 2/2002 |
| JP | 2003-234120 | | 8/2003 |
| JP | 2003-247793 | | 9/2003 |
| JP | 2004-034853 | | 2/2004 |
| JP | 2004-169977 | | 6/2004 |
| JP | 2008-144983 | | 6/2008 |
| WO | 2009044139 | | 4/2009 |
| WO | 2009050795 | | 4/2009 |
| WO | WO 2009044139 A2 | * | 4/2009 ............. F01K 3/06 |
| WO | 2011094371 | | 8/2011 |
| WO | 2011104556 | | 9/2011 |
| WO | 2012020233 | | 2/2012 |
| WO | 2013093135 | | 6/2013 |

OTHER PUBLICATIONS

Chinese Search/Exam Report in Chinese Patent Application No. 201380031315.6, dated Mar. 1, 2016, 6 pages.
European Combined Search and Examination Report in British Patent Application No. GB1304594.3, dated Oct. 15, 2013, 7 pages.
European Combined Search and Examination Report in British Patent Application No. GB1410842.7, dated Aug. 19, 2014, 6 pages.
European Combined Search and Examination Report in British Patent Application No. GB1410844.3, dated Aug. 19, 2014, 5 pages.
European Combined Search and Examination Report in British Patent Application No. GB1410846.8, dated Aug. 19, 2014, 6 pages.
European Examination Report in British Patent Application No. GB1304594.3, dated Aug. 7, 2014, 6 pages.
European Search Report in British Patent Application No. GB1207107.2, dated Aug. 15, 2012, 4 pages.
European Search Report in British Patent Application No. GB1207109.8, dated Aug. 15, 2012, 4 pages.
European Search Report in British Patent Application No. GB1207114.8, dated Aug. 16, 2012, 5 pages.
European Search Report in British Patent Application No. GB1207115.5, dated Aug. 16, 2012, 5 pages.
G. Zanganeh et al., "Packed-Bed Thermal Storage for Concentrated Solar Power-Pilot-Scale Demonstration and Industrial-Scale Design", SciVerse ScienceDirect, 2012, pp. 3084-3098, Solar Engery 86.
International Search Report and Written Opinion in corresponding PCT Application No. PCT/GB2013/050628, dated Apr. 17, 2014, 17 pages.
Simone A. Zavattoni et al., "CFD Modeling Suitable for Concentrated Solar Power Applications: Thermal Insulation Based on Radiation Shields and Thermal Energy Storage Systems", International CAE Conference 2012, Oct. 22-23, 2012, pp. 1-10.

* cited by examiner

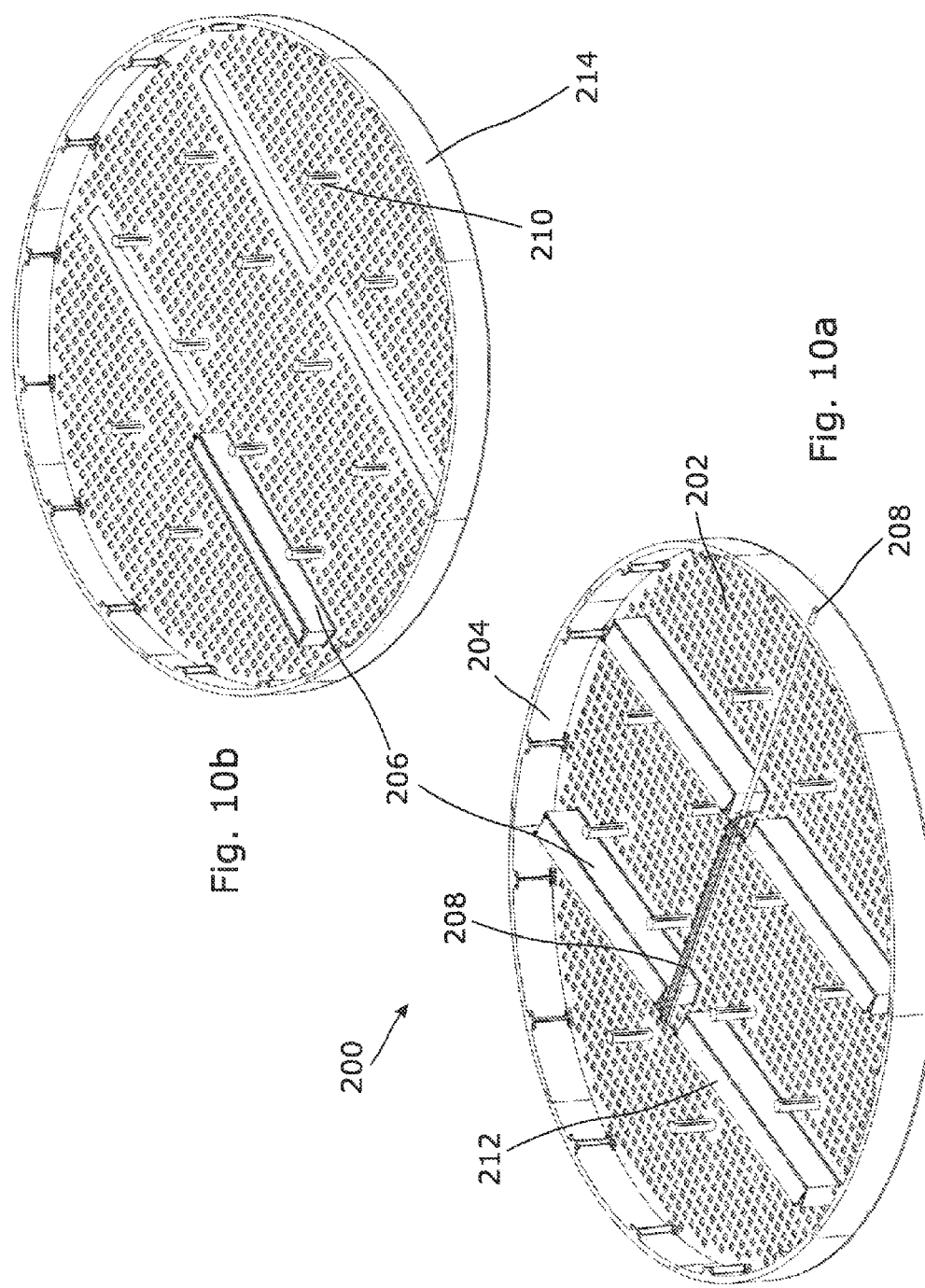

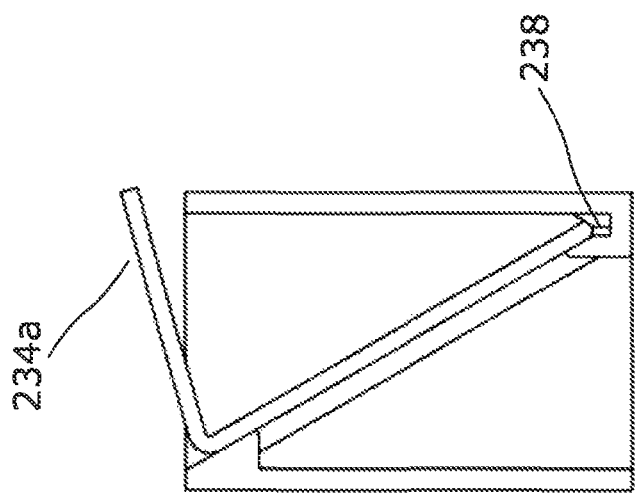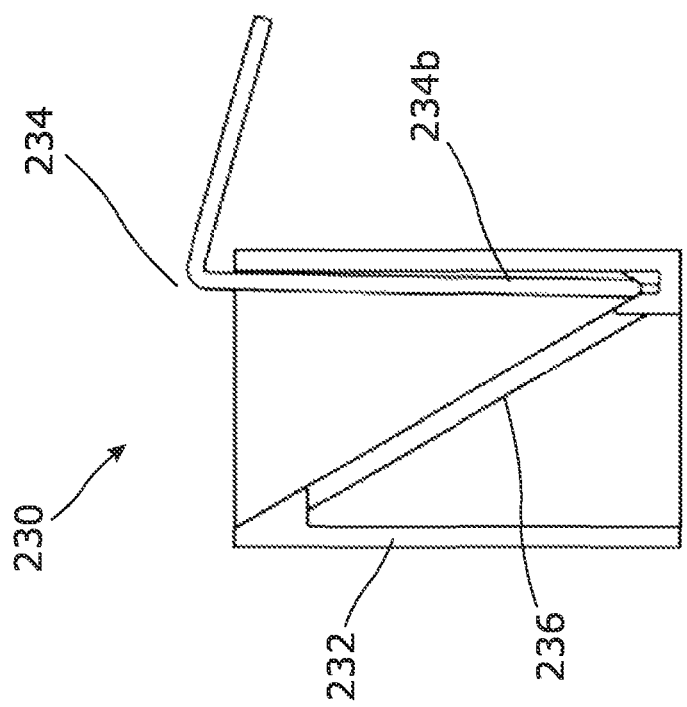

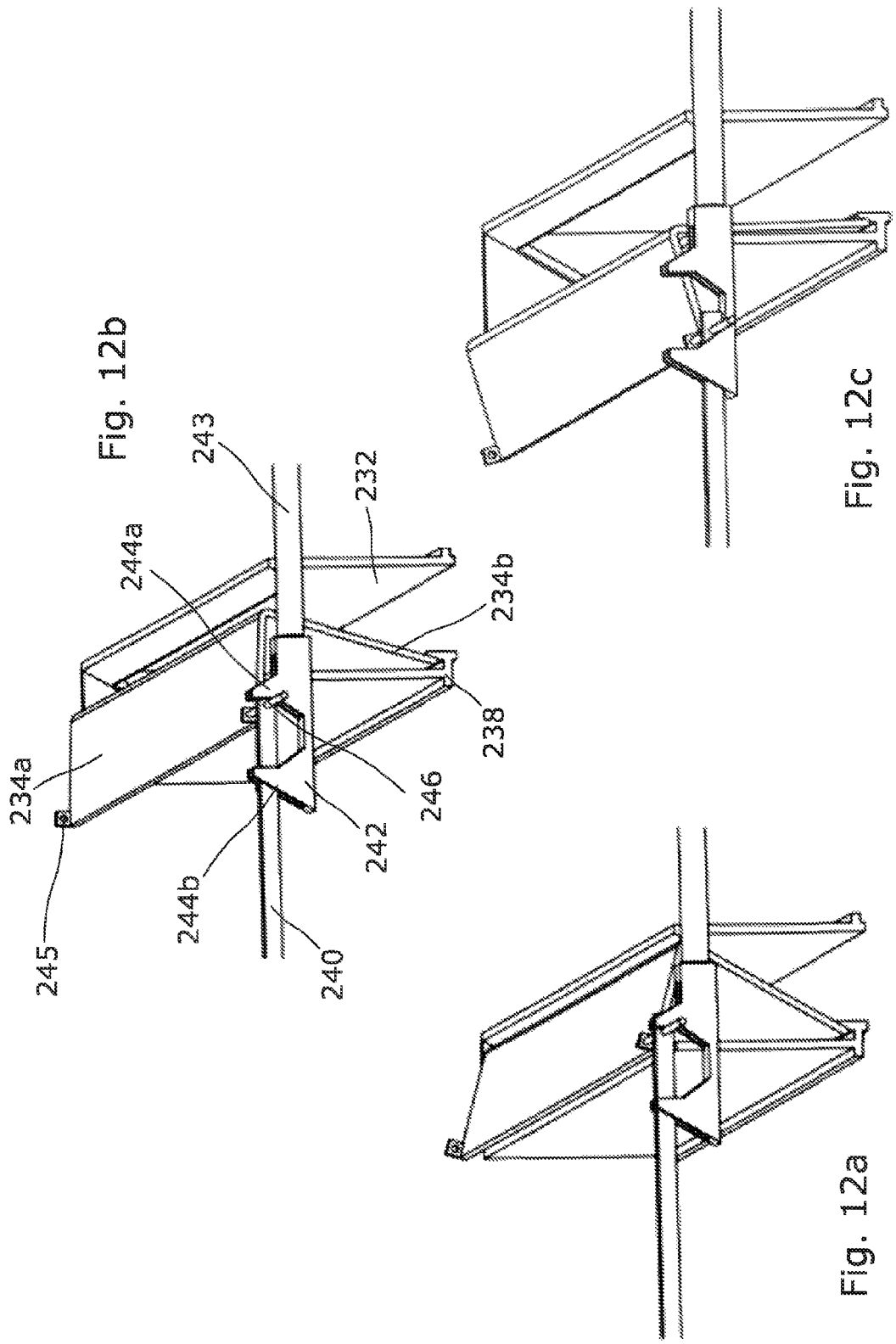

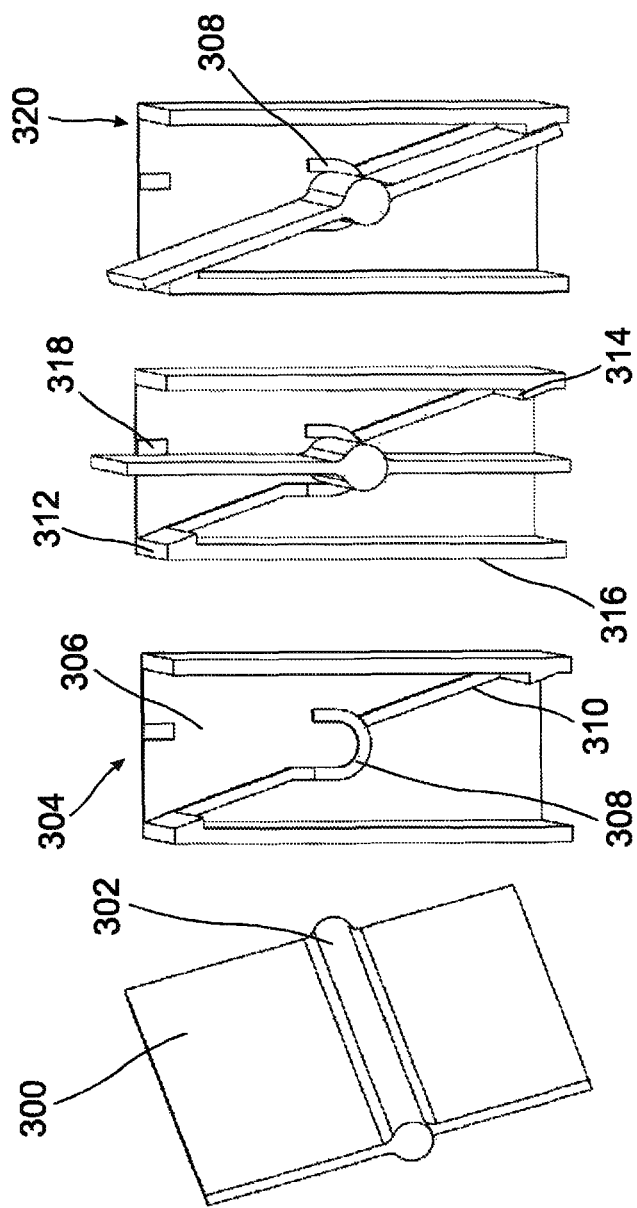

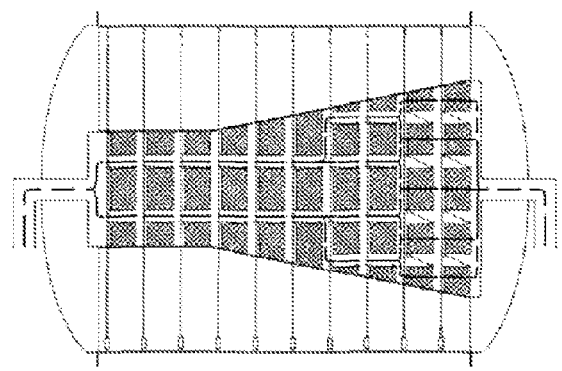
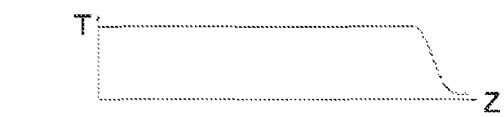
Fig. 19c
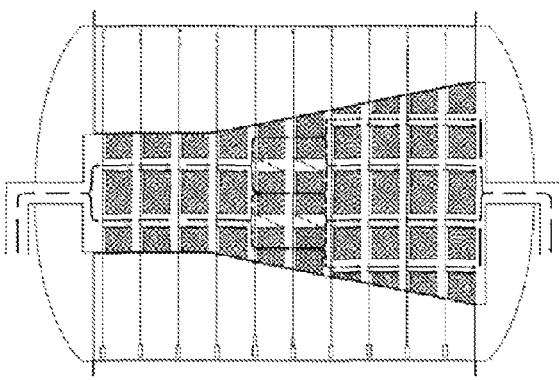
Fig. 19b
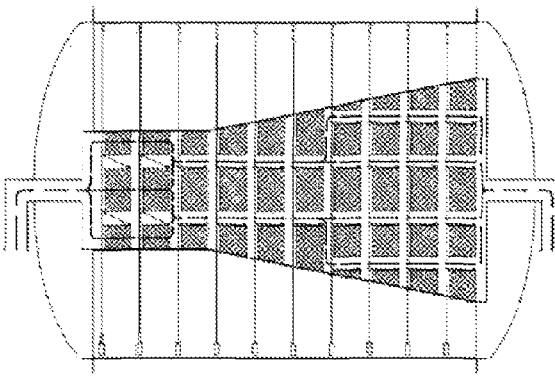
Fig. 19a

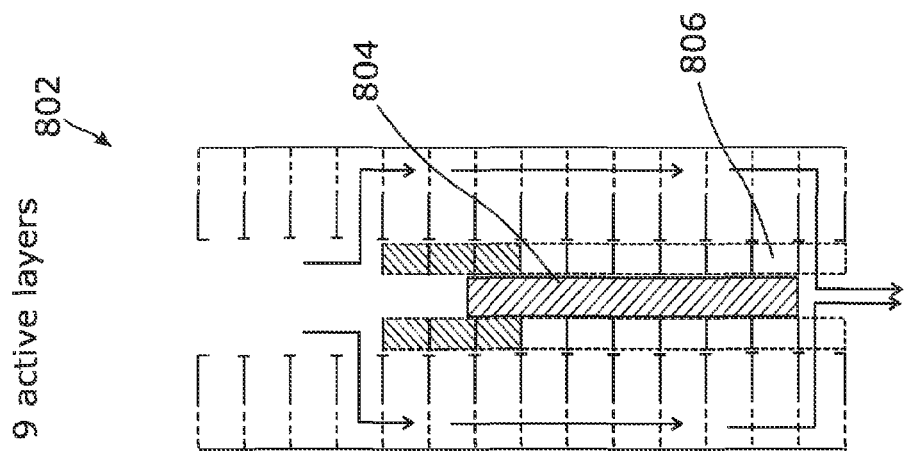
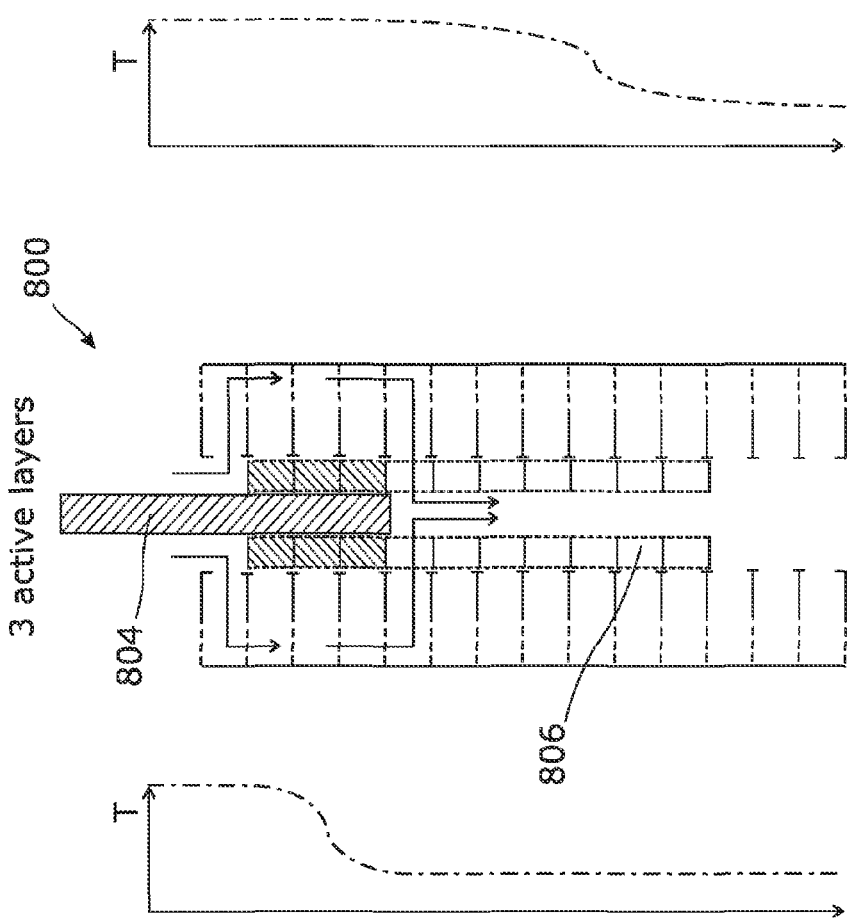
Fig. 20b
Fig. 20a
COMPARATIVE

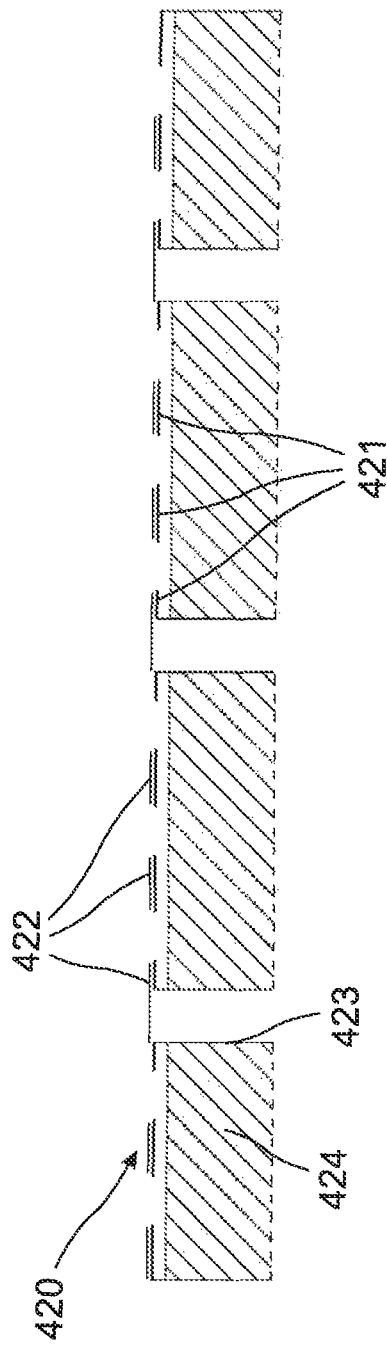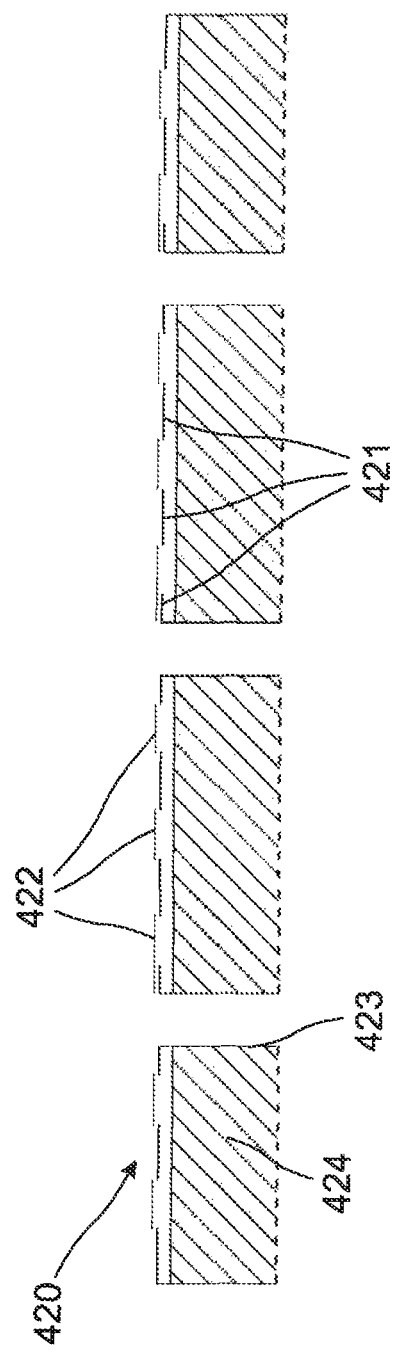

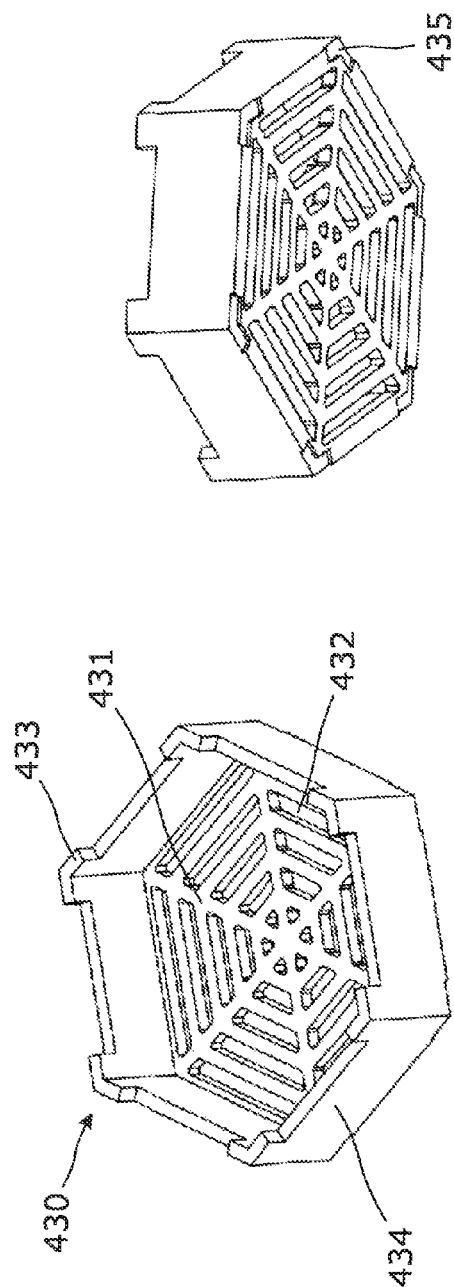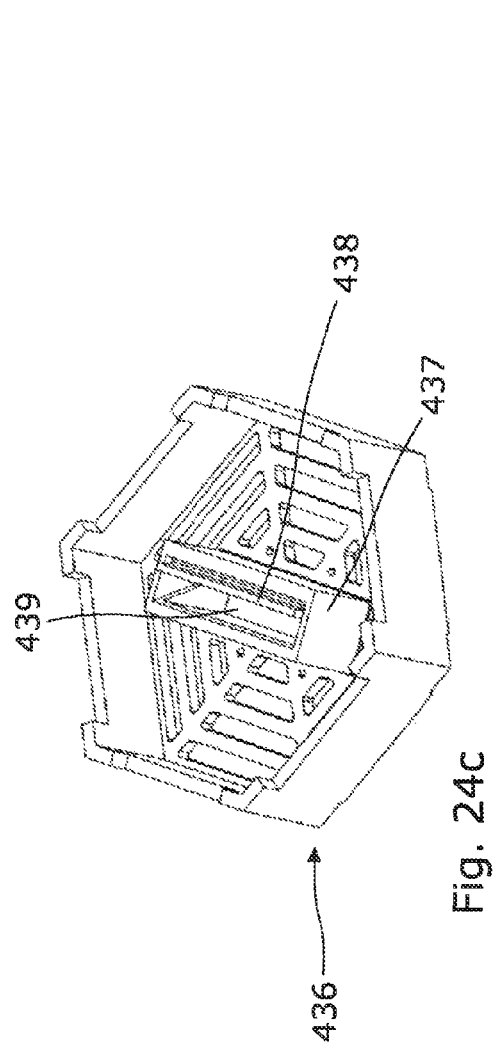
Fig. 24a
Fig. 24b
Fig. 24c

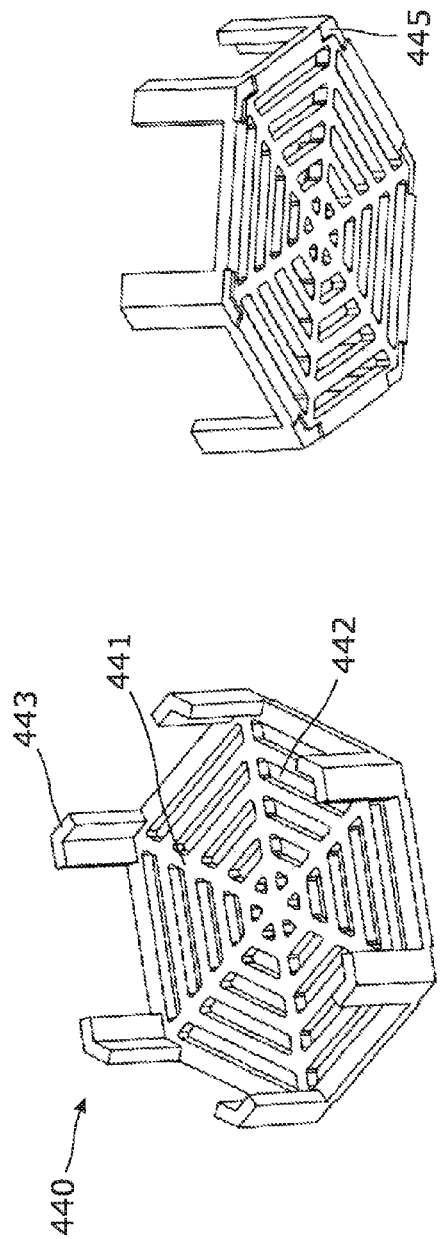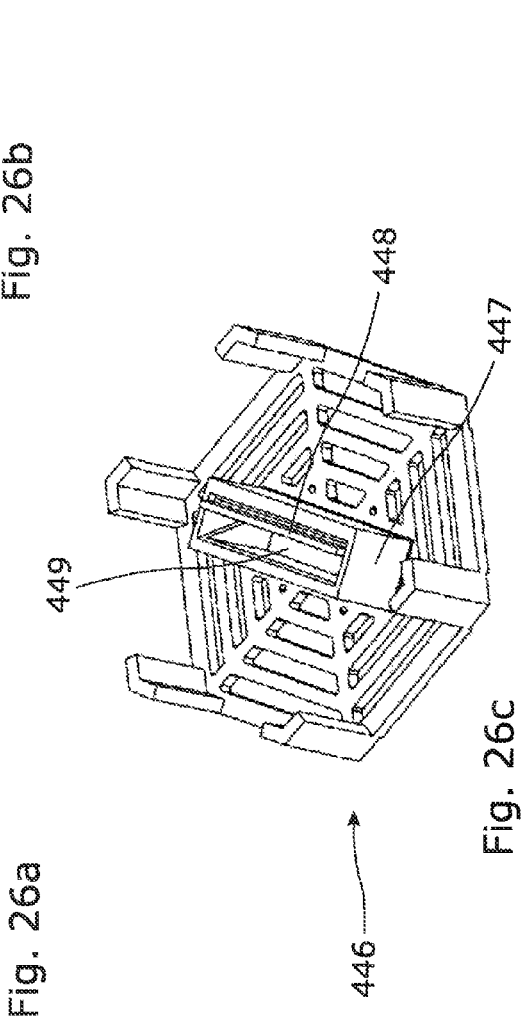
Fig. 26a
Fig. 26b
Fig. 26c

THERMAL ENERGY STORAGE APPARATUS

RELATED APPLICATION DATA

This U.S. national phase application is based on international application no. PCT/GB2013/050628, filed on Mar. 14, 2013, which claimed priority to British national patent application no. 1207114.8, filed on Apr. 23, 2012. Priority benefit of these earlier filed applications is hereby claimed.

TECHNICAL FIELD OF THE INVENTION

The present invention relates to thermal energy storage apparatus, and methods of constructing and operating such apparatus. It also relates to systems incorporating such apparatus, including energy storage systems, and in particular, electricity storage systems such as, for example, Pumped Heat Electricity Storage (PHES) systems.

BACKGROUND OF THE INVENTION

In certain applications it is desirable to store either 'heat' or 'cold' in thermal energy storage apparatus (hereinafter referred to as a "heat store") containing thermal storage media, which media is able to store the thermal energy efficiently until it is subsequently retrieved. The 'heat' or 'cold' is transferred to and from the thermal storage media by a fluid, normally a gas (e.g. an inert gas), that is in direct contact with the thermal storage media. The thermal storage media should have a high surface area to facilitate energy transfer, good porosity for gas flow, and a suitable thermal heat capacity in the temperature range of operation of the store. Usually, the storage media is provided as a porous particulate or porous solid media contained within an insulated pressure vessel. Particularly where the store forms part of an energy storage system where large amounts of heat or cold need to be stored, the mass of thermal storage media required can be in 10's or 100's of metric tonnes, requiring the construction of large, expensive pressure vessels. In such vessels, therefore, all dead space must be kept to a minimum.

As mentioned above, a higher surface area leads to better energy transfer. If smaller particles (or channels or pores in solid media) are used, then the surface area tends to increase per unit volume of storage media—i.e. it is said to have a higher "specific surface".

For example:—
Packed bed spheres 10 mm diameter (cubic packing) approx 314 $m^2/m^3$
Packed bed spheres 1 mm diameter (cubic packing) approx 3140 $m^2/m^3$
Porous metal foam 5 pores per inch (12% density) approx 430 $m^2/m^3$
Porous metal foam 40 pores per inch (12% density) approx 2100 $m^2/m^3$ This shows that packed spheres with 1 mm particle size have a specific surface of approximately 3140 $m^2$ of surface area in each cubic meter. For the porous foam metal with 40 pores per inch there is a specific surface of 2100 $m^2$ of surface area in each cubic meter. The density of the foam metal is 12% of the solid, which means that it has a void fraction of 88%. The void fraction of the spheres in this example is approximately only 50% by way of comparison.

There is a further advantage of using smaller particles with a higher specific surface. If smaller particles are used there are less "irreversible" thermal losses, since the particles equilibrate better and suffer less from internal thermal mixing (which would lead to a lower mean temperature for a particle after charging than the highest gas temperature experienced at its exterior, and hence, would lead upon discharge to the gas being reheated to a lower temperature). However, while these 'irreversible' thermal losses can be reduced by reducing the particle size, this increases gas pressure losses through the stores.

Particle size also affects store utilisation in terms of its effect on the thermal front. In a heat storage situation, a 'thermal front' is created in the storage vessel, i.e. a rise or a fall in temperature in the storage media and/or the gas with distance moved downstream, which occurs in an active region of the store i.e. where thermal transfer is most active.

FIG. 1 illustrates the formation of a thermal front in a thermal store and shows how the process of charging a thermal store sets up a thermal front within a region of the store that progresses downstream and that is usually initially quite steep but which (for a gas entering a store with storage media at a lower temperature) becomes progressively shallower as charging continues. Thus, the front starts with length L1, but as it moves down the vessel it extends in length to length L2 and then L3. As the front will usually be asymptotic, the length of the front can be discussed in terms of the length of the front between $T_{H2}$ and $T_{A2}$, these being within 3% of the peak temperature $T_{H1}$ and start temperature $T_{A1}$. If different criteria are set i.e. within 2% of the peak and start temperatures, then the nominated front lengths will be slightly longer.

For a certain store geometry a longer front will give lower thermal losses, but the length of the front will also reduce the useable amount of the store i.e. it will reduce the store utilization. If a store is 5 m in diameter and 10 m long and the thermal front is 5 m of this length, then the store utilization is reduced to approximately 50%.

If the same sized store was used and the particle size was reduced, then the same level of thermal losses could be achieved with a much shorter front. So a smaller particle size in a packed bed or pore size in a porous media will tend to give better heat transfer, lower thermal losses and better store utilization (a shorter thermal front). The one disadvantage is that there is a pressure drop associated with the fluid flow through the bed and this pressure drop increases significantly as the particle or pore size reduces.

Pressure is not a vector quantity, but a pressure gradient may be defined with respect to distance. The resistance to fluid flow increases with a decrease in the particle size and gives rise to a pressure drop in the fluid ($\delta P$). In the case of a thermal store there is a certain pressure drop $\delta P$ over a store of length L, which in this case means the pressure gradient is $\delta P/L$. The pressure decreases in the direction of the fluid velocity so the gas pressure will be lower after the gas has passed through the store. This pressure drop is also the reason why the particle size in packed beds is not reduced to a very small size that will give much higher thermal reversibility. The losses from the pressure drop outweigh the benefits of the smaller particle size.

Another problem associated with the pressure drop over the store length is that, wherever possible, gas will tend to try to escape from the centre of the storage media and instead flow down the sides of the chamber bypassing the media leading to poor thermal exchange. It is, however, difficult to provide adequate sealing within a thermal store since they present particular issues of size and thermal cycling. As a store is charged or discharged, temperatures can vary by hundreds of degrees and as the thermal front progressed up or down the store the respective upstream and downstream sections experience relative thermal contraction/expansion which can lead to gaps of 2-20 cm for example in a large heat store. Allowance must therefore be made for such thermal expansion effects, while retaining adequate sealing.

Applicant's earlier application WO2011/104556 describes a thermal store in which the size and type of media can be varied through the thermal store to either reduce the irreversibilities that are created when a thermal front is generated or else to reduce the pressure drop of a gas passing through the storage media by increasing particle size.

Thermal stores may be used in energy storage systems and, in particular, in Pumped Heat Electricity Storage (PHES) Systems, where at least one hot store and at least one cold store are required. Applicant's earlier application, WO2009/044139, describes a PHES system and that system 2 is illustrated schematically in FIG. 2. The system 2 comprises two large storage vessels 4,6 of particulate media 10 wherein electricity is used by a heat pump/engine machine 8 in a charging cycle (clockwise—as indicated by the arrow) to pump heat from one vessel 4 (the 'cold' store) to the other vessel 6 (the 'hot' store) resulting in the first vessel 4 cooling and the second vessel 6 heating. The electricity can then be regenerated by reversing the cycle (i.e. anti-clockwise direction) and passing the heat from the hot store 6 back through the machine to the cold store 4, while the machine 8 drives an electricity generator. The total energy storage is only limited by the size of the thermal energy stores, and hence, their design is critical to the overall system.

The present invention is directed towards providing a thermal energy storage apparatus of an improved design and, in particular, apparatus suited for use in an energy storage system.

SUMMARY OF THE INVENTION

1st Aspect

In a first aspect, the present invention provides a thermal energy store comprising a chamber having a gas inlet, a gas outlet, and a plurality of successive downstream thermal storage layers disposed therebetween, each layer comprising gas permeable thermal storage media, the store being configured for gas flow from the gas inlet to gas outlet through the layers for transfer of thermal energy to or from the storage media, wherein one or more layers each comprise a valved layer provided with at least one valve operable to allow or prevent bypass gas flow through that layer.

The gas flow route through a valved layer may therefore be selectively controlled by its valve(s); if the latter is open, at least some gas will bypass the thermal storage media and instead pass through the valve (i.e. "bypass valve(s)") so as to pass through the layer, this being an easier route. The valve may be associated with only one layer and may be a fixed valve that forms part of the valved layer, for example, a valved opening in the layer with an associated fixed valve mechanism.

The valve may comprise a valved opening through the layer having a valve mechanism associated therewith, which may be either inside the opening capable of blocking it e.g. a pivoting or rotating valve flap, or, acting on either side of the opening so as to block it e.g. a sliding valve mechanism such as a sliding valve, screen valve or rotating plate valve. For example, a sliding screen valve could be provided between two layers comprising a static multi-apertured valve seat across which a multi-apertured screen valve plate is mounted for lateral reciprocation to open and close the apertures of the valve seat, where at least a proportion of the apertures in the valve seat communicate with passages through the storage media which allow bypass gas flow.

As the gas flows through the storage media in order for thermal transfer to occur, there is a pressure drop associated with this constrained flow. In very large thermal stores, this can be a considerable pressure drop. By minimising gas flow through inactive regions of the storage media e.g. upstream regions where thermal transfer is substantially complete, and/or downstream regions where minimal thermal transfer is occurring, it is possible to minimise this pressure drop. By dividing the thermal energy store into a plurality of successive downstream thermal storage layers, i.e. arranged for gas flow in series through the successive layers, and then providing one or more layers with valving i.e. as "valved layers", it is possible effectively to bypass (the media of) thermally inactive valved layers (valves open) in the series, thereby reducing the pressure drop experienced by the gas as compared with the drop experienced across an unvalved layer. A valved layer arrangement (as opposed to dedicated flow passageways passing through the store) secures the least dead space within the store, which can also be important for large stores.

The valves in a valved layer may be operable to allow or prevent bypass gas flow through the valves dependent upon the extent of the thermal transfer in the store, and in particular, the extent of the thermal transfer in that layer.

Each valved layer may be provided with a plurality of spaced valves. An arrangement of multiple, spaced valves improves lateral gas distribution throughout the cross-section of the store (in that gas bypassing a valved layer through its valves is doing so at multiple locations). Where the valves in each valved layer are configured for actuation independently of other valved layers, selective exposure or isolation from the gas flow for an individual valved layer is achieved, which allows more precise flow control through the store.

Preferably, every layer in at least a central section of the store is a valved layer. Ideally, every layer of the store may be a valved layer since even a single unvalved layer always presents a pressure drop; however, non-valved layers may be needed at the inlet/outlet of certain types of stores for safety reasons (e.g. to prevent run-away).

The valves may be configured to act automatically, either in accordance with a pre-programmed sequence (where operation is predictable), or, in response to detected temperature changes from inbuilt sensors; this may include sensors at the inlets and/or outlets and/or sensors arranged along the length of the chamber. Alternatively, the valves may be controlled by a control system that selectively alters the gas flow path during operation. The control system may include sensor or other feedback systems that provide information to the control system as to the extent of progression of the thermal transfer within the storage media; these may be provided inside/outside the thermal store along its length to monitor the position of the thermal front inside the chamber and/or at the exit to measure the exiting gas temperature.

The store may comprise a control system configured to alter the flow path of the gas flowing from inlet to outlet in response to the progress of the thermal front.

The gas flow path may be selectively altered depending upon the progression of a thermal front moving through the chamber. As indicated above, by "thermal front" is meant the change in temperature, either a rise or fall in temperature in the storage media and/or the gas, which appears in a region of the store where thermal transfer is most active. The media/gas upstream of the position of the front is roughly at a similar temperature to the gas entering the store (i.e. where thermal transfer usually is more or less complete—when charging a hot thermal store the storage media would be at a temperature approaching that of the gas entering the thermal store) and the media/gas downstream of the position of the front is at a similar temperature to the storage media prior to the start of the process (i.e. where thermal transfer is more or less uninitiated—when charging a hot thermal store the gas would be approaching the temperature of the media prior to the start of charging). The gas flow path may be altered so that it only passes through a localised region of the storage media in which the thermal front is located (i.e. an active heat transfer region of the media). Thus, as the thermal front progresses along the length of the store where valved layers are provided, gas flow may, in turn, be confined to different respective thermally active layers of the storage media.

Any alteration in gas flow path will usually alter the distribution of gas between respective upstream and downstream layers of the storage media, but leave the lateral gas distribution unchanged. The flow path may be altered at least two or three times during a charging cycle, or a discharge cycle. The gas flow path may be diverted to flow through respective downstream regions, in turn, of the storage media, which may be overlapping regions or different adjacent regions.

In one embodiment, the control system is configured to divert the gas flow path into different selected downstream groups of adjacent valved layers, in turn, as the thermal front moves downstream, by closing the valved openings of those selected groups of layers in turn.

In a preferred embodiment, the control system is configured to divert the gas flow path into selected adjacent valved layers occupied by the thermal front (i.e. where thermal transfer is active) by closing the valved openings of those layers, while the valved openings in valved layers upstream and/or downstream, where there is minimal thermal transfer, are kept open.

The store may be configured such that, during operation, the flow path of the gas can be altered to bypass thermal storage layers upstream of the thermal front, in which layers thermal transfer is substantially complete.

The store may be configured such that, during operation, the flow path of the gas can be altered to bypass thermal storage layers downstream of the thermal front, in which layers thermal transfer is minimal. These two path alterations will usually be carried out independently of one another. This independent control of the upstream and downstream faces of the thermal front is possible because the store is divided into layers and flow control is provided in each valved layer by valving (preferably with each valved layer being independently controlled). Usually, the store is configured such that, during operation, the flow path of the gas can be altered such that it only passes through thermal storage layers in which all or part of the thermal front exists.

In a preferred embodiment, the chamber is an upright chamber comprising a plurality of horizontal thermal storage layers arranged above one another in between the gas inlet and the gas outlet such that the store is configured for vertical gas flow from the gas inlet to the gas outlet through the thermal storage layers. The store is advantageously arranged such that the gas inlet is provided at the top of the chamber when it is set up as a hot inlet or at the bottom of the chamber when it is set up as a cold inlet.

A gap or plenum for lateral gas distribution may be provided above the thermal storage media in each layer (as opposed, for example, to abutting layers where gas distribution occurs via a network of delivery passageways). Optionally, highly porous insulating layers may also be provided that provide minimal resistance to gas, but that reduce heat transfer between layers and the development of any convection flows. The use of an insulating layer interposed between respective downstream layers will assist in preserving the profile/characteristics of a thermal front if a store needs to be left part-charged.

The storage media may comprise any material suitable for thermal exchange at the temperatures and pressures contemplated in the thermal store. The media may comprise respective monolithic layers (at least some of which have integral valves) provided with an interconnecting internal network of passageways/pores, or it may be a packed bed of particulate material, including fibres, particles or other usually solid material packed so that it is gas permeable. This material may be uniform in size, shape, and composition throughout the store or may vary, as required. In the case of particulate material, the smaller and more densely packed the material, the greater the potential for pressure drops, and hence, the more desirable the use of flow regulation. Such layered stores therefore facilitate the use of particle sizes of 20 mm or less, or 10 mm or less, or even 7 mm or less. As the same applies to small pore sizes in solid media, in all aspects of the invention there are benefits when the particle or pore sizes selected have a specific surface of below 300, or even 500, or even 1000 $m^2$ of surface area in each cubic meter.

In a preferred embodiment, the plurality of thermal storage layers are in the form of a layered support assembly in which the (preferably particulate) thermal storage media of each layer is supported by the support assembly. The assembly may have been constructed by mounting the thermal storage layers on top of each other to form a stack.

Within the layered support assembly, it is usually desirable to ensure the gas flow can only bypass the thermal storage media in the valved layers via the valved openings (i.e. there are no other elongate passageways or gaps (with or without flow controllers) extending through the chamber through which gas can bypass the storage media).

The store may comprise any suitable feature of the second aspect of the invention relating to a layered support assembly, as detailed below.

For example, where the base of a valved layer is formed from porous tiles, the valve may be provided inside a single tile. Furthermore, in order to prevent flow bypassing the entire store (given there will be a pressure drop across the store per se), or to stop flow bypassing individual layers (e.g. where valves are closed), baffles may be provided as detailed in the second and third aspects to prevent undesired bypass flow between the layered support assembly and the chamber wall, and these may optionally be provided for each respective layer.

The valved layer may comprise at least one actuating mechanism for the valve(s) arranged above (or through) the thermal storage media.

In one embodiment, the actuator is a solenoid actuator or a pneumatic actuator or mechanical actuator. The actuators may be housed externally of the support assembly, preferably in thermal insulation.

A single valved layer may comprise a plurality of valves so configured as to be operated in unison by a single actuation mechanism.

The valve may be mounted or inset in the layer (or section) and may comprise a screen valve or valve plate or flap disposed within a framed opening or on a valve seat anywhere within the layer/section; the frame may extend through only a single valved layer or through multiple layers. Frames may also be vertically aligned in respective layers for direct flow. They may be load-bearing and arranged to stack upon one another, optionally with some form of secure fit/interlock. Vents or openings to permit gas flow into the frames and to permit operation of the valve mechanism for each valved layer would then be necessary.

The valves may comprise flap valves mounted in framed openings.

The valves of the valved layers may comprise actuator operated monostable valves biased to return to the closed position in the event of failure of the actuator. Such a valve, especially a monostable flap valve, will protect any machinery downstream of the store by ensuring that any very hot or very cold gases entering the store can never directly leave the store at the same temperature (which machinery downstream is not intended to withstand).

The flap valves may comprise butterfly flap valves. The latter have the advantage that where there is particulate storage media, any media that has become trapped in the valve can fall away when the valve is opened. The butterfly flap valves may be counter-weighted such that they will always close unless opened by an actuating mechanism.

The store may comprise a plurality of adjacent valved layers and the valves in adjacent layers may be vertically aligned to provide bypass passageways extending through the store. This arrangement provides the most direct flow path and least pressure loss across the store.

There is further provided a method of operating a thermal energy store as described above, wherein the store comprises a control system that selectively alters the flow path of the gas flowing from inlet to outlet by controlling the valves in each valved layer in response to the progress of a thermal front through the store.

There is further provided an energy storage system comprising one or more thermal energy stores as described above, which may be an electrical energy storage system or any energy storage system in which an (insulated) heat store is required temporarily to store thermal energy.

This may comprise a pumped heat electricity storage (PHES) system comprising:—
  a compression stage for compressing gas;
  a first thermal store for receiving and storing thermal energy from gas compressed by the compression stage;
  an expansion stage for receiving gas after exposure to the first thermal store and expanding the gas; and,
  a second thermal store for transferring thermal energy to gas expanded by the expansion piston.

The compression and expansion stages may comprise positive displacement devices, for example, compression and expansion piston assemblies. The PHES system may then comprise:—
  a compression chamber;
  an inlet for allowing gas to enter the compression chamber;
  compression piston for compressing gas contained in the compression chamber;
  a first thermal store for receiving and storing thermal energy from gas compressed by the compression piston;
  an expansion chamber for receiving gas after exposure to the first thermal store;
  an expansion piston for expanding gas received in the expansion chamber; and
  an outlet for venting gas from the expansion chamber after expansion thereof; and,
  a second thermal store for transferring thermal energy to gas expanded by the expansion piston.

There is further provided, in accordance with the first aspect, a thermal energy store comprising an upright chamber comprising a plurality of horizontal thermal storage layers arranged above one another in between a gas inlet and a gas outlet, each layer comprising gas permeable thermal storage media, the store being configured for vertical gas flow from the gas inlet to gas outlet through the layers for transfer of thermal energy to or from the storage media, wherein at least one layer comprises a valved layer provided with at least one (integral) valved opening operable to allow or prevent gas flow through that layer.

There is further provided, in accordance with the first aspect, a thermal energy store comprising an upright chamber having a gas inlet, a gas outlet, and a layered support assembly disposed inbetween supporting gas permeable thermal storage media, the store being configured for vertical gas flow from the gas inlet to gas outlet through the assembly for transfer of thermal energy to or from the storage media, wherein the assembly comprises a plurality of thermal storage layers each supporting thermal storage media and mounted on top of each other to form a stack, wherein at least one layer is a valved layer provided with at least one valved opening therethrough that allows gas flow to bypass that layer.

It will be appreciated that the improved heat storage apparatus with valved layers of storage media, where the storage media may have small particle/pore sizes but the valves can allow different layers of the store to be used in turn, may have better heat transfer and/or reduced overall pressure drop. It will be appreciated that the thermal store may be designed so that only a few layers are active at any one time i.e. has gas passing through it.

The present invention further provides any novel and inventive combination of the above mentioned features which the skilled person would understand as being capable of being combined.

2nd Aspect

In accordance with a second aspect of the present invention, there is provided thermal energy storage apparatus comprising an upright chamber having a gas inlet, a gas outlet, and a layered support assembly disposed inbetween and supporting gas permeable thermal storage media, the store being configured for vertical gas flow from the gas inlet to gas outlet through the assembly for transfer of thermal energy to or from the storage media, wherein the assembly comprises a plurality of thermal storage layers each supporting thermal storage media and mounted on each other to form a layered stack.

The layered support assembly is constructed by building (stacking) layers up on top of each other to form a stack (i.e. so that lower layers cannot be removed) of the desired capacity. The layered store of the first aspect provides advantages for flow control and hence controlling pressure drop, especially where storage media with small pore or particle sizes are involved. As the thermal front passes each way through the store there will be expansion and contraction of each layer relative to the layers around them. The use of a layered support assembly approach assists with ensuring that there is enough tolerance within the structure for this expansion/contraction to occur without putting excessive loads on components.

In one embodiment, each layer comprises a plurality of load-bearing supports. The load-bearing supports may form one or more supporting columns extending through the layered stack. These may extend through the part or the entire length of the stack.

The load-bearing supports may comprise pillars, or arches or any other suitable structural element (e.g. capable of carrying vertical loads, principally in compression).

In one embodiment, each layer comprises a base supported by a plurality of load-bearing supports (e.g. pillars). Each layer may comprise a porous base that supports particulate thermal storage media in that layer. Usually, the porous base is designed only to support storage media in that layer; that is, it is not intended to be load-bearing in respect of the remaining structure. The porous base is optionally provided with a finer porous mesh or grid to retain the storage media.

Each layer may comprise a porous base supporting particulate storage media, a set of load-bearing supports (e.g. pillars) supporting the porous base and optionally interlocked therewith, and an outer support wall to retain the storage media. (The storage media does not itself support the layers above it.)

Advantageously, the layered support assembly is formed from structural units where any internal surfaces are surrounded by storage media and where there are no adjacent vertical surfaces (e.g adjacent walls) that could inadvertently provide bypass flow passageways and would require sealing. An arrangement where the only structural units are a base and load-bearing supports (e.g. pillars or arches) and an external support wall is therefore preferred. Where any vertical surfaces (e.g. internal surfaces of support walls) are necessary, these should not be smooth but rather should preferably be provided with surface relief (e.g. ribbing or abraiding or texturing) so as to discourage edge flow.

The bases and load-bearing supports of the layered support assembly may form a self-supporting, preferably interlocked, structure. The interlocking, if present, may be designed primarily to resist tensile forces, and may also be designed to allow for relative thermal expansion effects.

Each layer may comprise an integral (i.e. one-piece) building unit or "tray" that can be combined in an interlocked, tessellating arrangement to form a coherent layer of the assembly, as well as being stackable on a similar tray below. The tray may comprise a base shaped from a tessellating polygon, and load-bearing supports for a building unit or "tray" above, and optionally an outer wall. The latter may add strength and support but adds mass and could encourage bypass edge flow; hence, this may be a grid or framework rather than a smooth wall. The supports may be provided inside or at the edge of the base or may form part of an outer wall. The supports and the base at least should be provided with mating means such that one building unit or "tray" may be stacked upon another one as a secure fit. The tray should be provided with interlocking mechanisms such that adjacent trays may be assembled alongside one another in a tessellating arrangement to form a single coherent layer in which the adjacent trays may be interlocked with one another to resist tensile forces.

The stack may be built up layerwise by adding one or more layers at a time. Usually, it is built up layer-by-layer such that the thermal energy storage capacity may be varied by removal/addition of a layer, and each layer is constructed (and optionally back-filled with storage media) before the next layer is added.

In one embodiment, a gap or plenum for lateral gas distribution is provided above the thermal storage media in each layer.

The layers may be identical in cross-section. The layers may be identical in height and the layers may be filled identically with the same type (e.g. same composition, size, configuration) and amount of media. Alternatively, the layers may be tapered in cross-section, as described in relation to the fourth aspect detailed below, in order to modify the thermal front behaviour.

In one embodiment, each supporting column is formed of a plurality of pillars, the pillars having mating upper and lower ends configured so as to stack upon one another. Each supporting column may be formed from one pillar contributed from each layer.

Where the bases and pillars form a self-supporting structure, the pillars may have upper and/or lower ends configured to support and optionally interlock with the base. In that case, the pillars may have upper or lower ends with an outwardly disposed annular ledge for supporting the undersides of the bases and a concentric, annular, recessed portion disposed inwardly of the ledge, for receiving locating lugs provided upon the undersides of the bases. Also, the pillars may have the outwardly disposed annular ledge and inwardly disposed annular recessed portion provided within their upper ends. Alternatively, the pillars may have the outwardly disposed annular ledge and inwardly disposed annular recessed portion provided in an outwardly extending foot on their lower ends.

In one embodiment, the layered assembly is hexagonal or circular in cross-section.

Where each layer comprises a porous base supporting particulate storage media, pillars supporting the base and an outer support wall to retain the media, the outer support wall may be supported by pillars and is optionally a "drop-in" fit in the pillars. In another arrangement, the outer support wall may comprise mating upper and lower ends configured so as to stack upon one another.

The outer support wall may be made up of wall sections and the top and/or bottom and/or side edges of the wall sections are configured so as to compensate for relative thermal expansion/contraction between respective adjacent support layers. To that end, the sections may be arranged to overlap or interlock with play to counter thermal expansion effects.

Where each layer comprises a base supported by pillars, the base may comprise a plurality of porous tiles.

The porous tiles may be shaped as congruent squares, hexagons or triangles, including equilateral triangles.

The base is conveniently assembled using tessellating polygons, which may advantageously be congruent (same size and shape) regular polygons, namely, either made up of congruent squares, equilateral triangles or hexagons, or made up using a variety of regular polygons. Since a hexagon is formed from six equilateral triangles a mixture of equilateral triangles and hexagons (corresponding in size to six of the equilateral triangles) may be used. Preferably, the base comprises tiles shaped as equilateral triangles supported only by load-bearing supports (e.g. pillars) at their respective vertices.

The load-bearing supports may be provided in the assembly at the respective vertices of the tiles.

The bases and load-bearing supports of the layered support assembly may form a self-supporting interlocked, structure with the tiles configured at their respective vertices for interlocking engagement with the load-bearing supports.

Cut-away sections may be provided in the tiles at their vertices to accommodate load-bearing supports and lugs or other projections may be provided on the undersides of the tiles for interlocking engagement with the load-bearing supports so as to withstand tension.

In a PHES system, a hot store may need to withstand operating temperatures of between ambient temperature and more than 300° C., especially more than 450° C., while a cold store may need to withstand temperatures ranging from ambient temperature to less than −50° C., especially, less than −100° C., or −140° C.

In one embodiment, the layered support assembly is formed from (e.g. casted\moulded) concrete components and these may be refractory concrete components that are able to withstand high operating temperatures for use in a 'hot' store or concrete components that need not be refractory, for use in the 'cold' store. However, low water content castable materials are desirable in a sub-zero cold store, and some refractory concretes have low water content and could therefore be used.

In another embodiment, the components can be made of a metallic material, ordinary concrete or a plastic or fibre reinforced plastics or a combination of materials.

Thus, the tiles and/or base, load-bearing supports such as pillars, arches or the like, wall sections, and any flow controlling components such as, for example, valve frames may be formed from castable (optionally refractory) concrete materials. The total mass of storage media supported by a layered support assembly may exceed 3 metric tonnes, or 10, or 50, or even 100 (metric) tonnes. The total height of the layered support assembly may exceed 1 m, 1.5 m, or even 2 m. Its total diameter may exceed 2 m 3 m, or 4 m or even 5 m. The total temperature change during charging/discharging exceeds 50K, 100K, or even 120K in a cold store (i.e. one encountering freezing temperatures). The total temperature change during charging/discharging may exceed 200K, or 300K, 400K for a hot store.

The apparatus may comprise any suitable features already described above in relation to the first aspect. At least some layers may be provided with valved openings (or valves) therethrough that allow gas flow to bypass the storage media in that layer. Where the base is formed from porous tiles, some of them may include a valved opening. The valved openings in respective layers may be vertically aligned to provide bypass passageways extending vertically through the stack.

The valves may comprise any suitable valve such as, for example, flap valves, butterfly valves or sliding or rotary valves, and in particular, monostable or bistable flap valves.

Sealing may be provided by a gas-tight jacket including any of the features as detailed below in respect of the third aspect.

In one embodiment, baffles extending radially outwardly from the layered support assembly are provided at the level of each layer to prevent vertical bypass flow between adjacent layers along the exterior of the layered support assembly.

In one embodiment, the layered support assembly is closely sealed around its vertical exterior to limit vertical bypass flow between the layered support assembly and the chamber interior wall.

Since the thermal storage media in respective layers may be surrounded by a (non gas-tight) wall structure, preferably, in each layer, the internal surface at least of the wall structure intersects respective wall structures above and below it at a level below the level of the thermal storage media, so that any gas attempting to exit the layers will have to do so through the thermal storage media. The internal wall in this region may be additionally shaped to make a more tortuous path for gas to travel when adjacent to the wall and thereby also decrease any gas leakage.

Partial or full tapering of the layered support assembly may be provided including any suitable features, as detailed below in respect of the third aspect. Hence, the layered support assembly may be divided into respective individual horizontal layers supporting thermal storage media, at least some of which layers increase in horizontal cross-sectional area with increased distance from the top inlet/outlet of the store.

Usually, the gas inlet is set up at the top of the chamber as a hot inlet or at the bottom of the chamber as a cold inlet, so as to minimise any undesired convection effects.

There is further provided in accordance with the second aspect a modular layered support assembly for supporting thermal storage media within a thermal energy store, wherein the assembly comprises a plurality of thermal storage layers for supporting thermal storage media mounted on top of each other to form a stack, the layers being supported by a plurality of load bearing supports.

There is additionally provided in accordance with the second aspect a method of assembling a thermal energy storage apparatus as described above, wherein the layers are successively built up on top of each other from the bottom of the assembly upwards until the desired storage capacity is reached.

The lowermost layer of the assembly may be assembled before the next layer is assembled on top of that layer, successive layers being individually added until the desired storage capacity is reached. Layers are preferably added individually. Assembly of each layer preferably comprises assembling the base of that layer and the pillars that occupy that layer and provide support for the next layer. After each layer is assembled it is usually back-filled with thermal storage media before the next layer is added. Alternatively it may be preferable to backfill the layer at below the one being assembled.

The storage apparatus may be erected in situ.

There is also provided an energy storage system comprising thermal energy storage apparatus as described above. This may be a pumped heat electricity storage (PHES) system, as described in respect of other aspects of the invention.

3rd Aspect

In accordance with a third aspect, there is provided a thermal energy store comprising a chamber comprising an inlet, an outlet, and a plurality of successive downstream thermal storage layers disposed therebetween, each layer comprising gas permeable thermal storage media, the store being configured for gas flow from the gas inlet to gas outlet through the layers for transfer of thermal energy to or from the storage media, wherein the thermal storage layers are surrounded by a gas-tight jacket that limits gas flow from externally bypassing the thermal storage layers.

For clarification, the store may be pressurised, and the chamber may be a pressure vessel, however the gas-tight jacket is designed to stop gas flow bypassing the storage media, with which there is an appropriate pressure difference. It is not intended to withstand system pressures, which are likely to be substantially larger. For example, in the hot store of a PHES system the pressure drop seen by the gas-tight jacket might be in the order of 0.02 bar gauge, while the system pressure might be 12 bar.

The chamber will usually comprise an upright chamber comprising a plurality of horizontal thermal storage layers arranged above one another in between the gas inlet and the gas outlet such that the store is configured for vertical gas flow from the gas inlet to the gas outlet through the thermal storage layers.

There will usually be a pressure difference across a thermal energy store from the inlet to outlet due to the close packing of the storage media. For a layered store, this difference from inlet to outlet will be the sum of the individual pressure losses that develop over each layer.

Depending upon the area of the store, the size of the particles, the depth of media that the gas is flowing through and the flow rate there will be a pressure drop associated with this flow. This pressure drop might be in the order of 200 Pa, 1000 Pa, 5000 Pa or 10000 Pa depending upon the application. Gas will therefore tend to escape into the area surrounding the central structure and use this space to flow the length of the store bypassing the thermal storage media (i.e. passing between the periphery of the thermal storage layers and the chamber interior wall), unless discouraged from doing so.

The use of a gas-tight jacket can manage this while also simplifying design considerations and helping to meet the strict design considerations associated with pressurised vessels, if one is used. For example, the thermal storage media will normally be insulated to reduce heat loss or gain. Insulation is far more effective if it is applied in a continuous manner—ie sheets without partitions for each layer penetrating the insulation. By providing a gas tight jacket as a gas barrier (so that gas is substantially prevented from going beyond it), it allows the insulation between the gas tight jacket and the vessel wall to be more continuous in nature and therefore more effective.

Also, as the thermal front passes each way through the store there will be expansion and contraction of each layer relative to the layers around them. A gas tight jacket can be designed to be flexible so that it can accommodate this movement without losing the gas tight integrity.

The jacket may encase and tightly conform to the external outline of the thermal energy layers. Insulation may be provided between the chamber wall and the jacket and is substantially uninterrupted.

The jacket will not usually support any structures other than itself and may therefore be a non-structural component supported by the thermal storage layers.

In one embodiment, the jacket comprises a thin, flexible membrane.

The jacket will usually be a thin, flexible membrane that can be shaped around the storage layers. Preferably, the store has an external outline of circular or regular polyhedral (six or more sides) cylindrical cross-section, either of constant or tapering diameter.

Although the jacket may be a one-piece membrane, it will usually be built up from individual (usually concave-shaped) sections or sleeves (i.e. a cylindrical section encircling one layer (for part or all of its height) or two or more layers) sealed together and arranged respectively downstream of each other.

The jacket may be formed from sheets of flexible material capable of being pressure sealed (e.g. crimping) or heat sealed or rolled or folded (e.g. parallel folds (halving each time) or zigzag folds) over one another, optionally with the use of fastening mechanisms such as glue, welding, riveting, or the use of missile joints or the like.

The jacket may be made from sheets of plastics (e.g. high temperature PTFE) material or metallic sheets e.g. sheet metal such as, for example, mild or stainless steel e.g. 0.2-2 mm thick. Metallic sheets may be pressure or heat sealed e.g. by a standing seam joint or welding. The store may be built up layerwise i.e. a small number of layers (i.e. 1 to 3) at a time.

The thermal storage layers may be built up layer-by-layer on top of each other and the jacket may also be built up layer-by-layer. Each storage layer may have its own corresponding jacket sleeve (circumferentially) surrounding that layer, either formed from a one-piece membrane or from respective sections sealed together to form a sleeve. Jacket sleeves may be sealed to sleeves immediately above or below by circumferentially extending sealing joints. In an alternative embodiment, the jacket sleeves overlap one another and are sealed in a further jacket that tightly encases all the respective jacket sleeves and is itself sealed.

The jacket may be formed from concave, "L" shaped cross-sectional sheet components comprising two limbs (e.g. a generally vertical section and a generally horizontal section). These components are concave such that one limb (e.g. a vertical section) form a cylindrical surface of the jacket surrounding the storage layers, while the other limb (e.g. a horizontal section) forms annular baffle surfaces that extend towards the thermal storage layers, preferably being incorporated within joints between respective storage layers.

It is preferable if the space between the gas tight jacket and the vessel wall be kept at the lowest pressure (in relation to either the inlet or outlet of the store), as then it is possible to keep the gas tight jacket in tension rather than compression. This may simply be achieved by having a spring loaded flap valves access the space between the gas tight jacket and the vessel wall from both the inlet and outlet of the store. These flap valves should open when the pressure in the inlet or outlet space outside the store is lower than that in the space between gas tight jacket and vessel wall. In this way the pressure will always be maintained at the lowest gas pressure in the store.

In one embodiment, the jacket comprises or is sealingly attached to annular baffle sections that extend radially inwardly from the jacket to the storage layers at intervals along the length of the store to restrict vertical bypass flow.

Such annular baffle sections prevent bypass flow from travelling very far down the store along the exterior of the layered support assembly.

Joints may exist between adjacent respective horizontal thermal storage layers and the annular baffle sections may extend radially inwards from the jacket to intersect the joints so as to restrict vertical bypass flow. As a result the space between the layers and jacket interior is effectively compartmentalised into annular spaces corresponding to each layer (or a few adjacent layers). The baffle sections may be sandwiched in the joints. Seals may be provided inside the joints to ensure that this is in a gas-tight or near gas tight manner, and expansion/contraction mechanisms (e.g. flanges resting in expansion gaps) may be provided to allow for relative expansion or contraction between respective thermal storage layers as the thermal front travels up or down the store. It should be noted that the pressure difference between layers is normally much smaller than the pressure difference between the inlet and the outlet of the store. The reason for this is that the difference between the inlet and the outlet of the store is the sum of all the pressure differences across the active layers. i.e. if the gas is passing through 10 layers then the pressure drop over the whole store will be approximately 10 times greater than that over one layer. Consequently the required quality of gas tight sealing interlayer can be lower as the pressure differences are also much lower.

Thus, as described above, the space between the thermal storage layers and the interior of the jacket is advantageously compartmentalised into respective downstream annular spaces that prevent gas flow from externally bypassing the thermal storage layers.

Within the gas-tight jacket, the thermal storage media in respective layers may be surrounded by a (non gas-tight) wall structure. Preferably, in each layer, the internal surface at least of the wall structure intersects respective wall structures above and below it at a level below the level of the thermal storage media, so that any gas attempting to exit the layers will have to do so through the thermal storage media. The internal wall in this region may be additionally shaped to make a more tortuous path for gas to travel when adjacent to the wall and thereby also decrease any gas leakage.

In particular, a gap or plenum for lateral gas distribution may be provided above the thermal storage media in each layer, and a gasket, baffle, or other suitable barrier is provided at the periphery of the plenum so that gas cannot directly exit the thermal storage layer at that height.

The plurality of thermal storage layers may be in the form of a layered support assembly in which each layer of the support assembly supports (preferably particulate) thermal storage media, the layered support assembly being surrounded by the gas-tight jacket, which jacket limits vertical bypass flow between the layered support assembly and the chamber interior wall.

The layered support assembly may have any of the features of the layered support assembly of the second aspect, as described above.

In one embodiment, each layer comprises an outermost support wall that encircles and retains the thermal storage media, and the store is built up layer-by-layer such that horizontally extending joints above or below the walls support the gas-tight jacket. In that case, the jacket preferably comprises or is sealingly attached to annular baffle sections that extend radially outwardly from the jacket and are sandwiched between the joints.

There is further provided, in accordance with the third aspect, a method of assembling a modular support assembly as described above, wherein the layers are successively built up on top of each other layer-by-layer and the horizontally extending joints above or below the walls are formed in a manner that supports the gas-tight jacket.

The present invention further provides any novel and inventive combination of the above mentioned features which the skilled person would understand as being capable of being combined.

4th Aspect

In accordance with a fourth aspect of the present invention, there is provided heat storage apparatus comprising at least one thermal store comprising an upright chamber having a gas inlet, a gas outlet, and a gas-permeable thermal storage media disposed therebetween, the apparatus being configured for vertical gas flow through the chamber from inlet to outlet for transfer of thermal energy to or from the storage media whereby the gas inlet is set up at the top of the chamber as a hot inlet or at the bottom of the chamber as a cold inlet, and wherein the horizontal cross-sectional area and volume (or mass) of thermal storage media available for thermal energy transfer increases with increased distance from the top (hotter) end of the store.

In this fourth aspect, the present invention is concerned with a store for storing thermal energy (i.e. 'heat' or 'cold') which, as has been described previously, is set up for vertical gas flow and for operation with the hottest part of the store at the top (i.e. so the hottest gas flow enters or leaves from the top of the store) and the coldest part at the bottom, so that the thermal fronts progress upwardly or downwardly through the store with minimal effects from convection.

As also previously described in relation to FIG. 1, during charging of a store a thermal front will tend to lengthen as it progresses down the store. This is partly because the heat capacity of materials rise with increasing temperature. Thus, when blowing gas into a colder store where the storage media is a material whose heat capacity increases with temperature over the range in question, then the volume of media that is active in the thermal front will increase as the store is charged. (Hotter upstream media needs more energy to increase by one degree in temperature as compared with cooler media further downstream, where the same packet of energy would allow several equivalent amounts of the same media to increase by one degree in temperature.) For a certain store geometry a longer front will give lower thermal losses, but the length of the front will also reduce the useable amount of the store i.e. it will reduce the store utilization. While a thermal front may be shortened by reduction in particle or pore size of the storage media, this can lead to increased pressure losses.

The present invention proposes the use of an increased cross-section and associated volume of storage media with distance from the top of the store, so as to minimise undesirable thermal front lengthening. This increase is always in this direction because the thermal stores are operated with the hottest part of the store at the top and the coldest part at the bottom.

This increase may occur progressively with increased distance from the top of the store (i.e. steadily in substantially equal increments). The change in horizontal cross-sectional area may occur along the whole length of the store, or, only over a selected section of the store, for example, a lower portion where a thermal front may lengthen most; this might be the lower three-quarters or two-thirds of the store, or the lower half, or even just the lower third or quarter of the store.

The rate of increase in horizontal cross-sectional area may be selected so as to compensate partly or fully for thermal front lengthening during operation, while the storage media will usually otherwise be kept the same. For example, other physical and chemical characteristics may be kept the same (i.e. same type, same shape and size, same heat capacity).

As described in relation to earlier aspects, the storage media may be monolithic and self-supporting, or, it may be particulate and supported in a support assembly, for example, as described previously, except that it would be of at least partly tapered design. The assembly may taper over part (e.g. widens towards its base) of its length or over the whole length.

In one embodiment, the thermal storage media is particulate and supported in an at least partly tapered support assembly. The particulate media may be as described in earlier aspects.

In one embodiment, the store is divided into respective individual horizontal layers of thermal storage media, at least some of which layers increase in horizontal cross-sectional area with increased distance from the top (hotter) end of the store.

Preferably, the cross-sectional area of the layers increases in such a way that where the storage media is the same, the volume of storage media increases, preferably in each successive layer, as you go from the top of the store to the bottom, or, just in lower sections of the store as exemplified above.

The layered structure may optionally have any suitable features as described in respect of earlier aspects. Thus, for example, plenums may be provided between the layers for lateral gas distribution and/or insulating layers. There may also be an arrangement of alternating single layers and single plenums.

The layers may comprise solid but porous storage media (e.g. monolithic structures e.g. foams) or particulate media supported in trays, etc, as described for earlier aspects.

In the case of particulate material, the smaller and more densely packed the material, the greater the potential for pressure drops, and hence, the more desirable the use of layered stores (and flow regulation as described below), especially for particle sizes of 20 mm or less, or 10 mm or less, or even 7 mm or less.

Conveniently, the volume and horizontal cross-sectional area occupied by insulation may be selected to decrease with increased distance from the top of the store. This is possible because the lower part of the store sees lower mean temperature rises, and may advantageously allow the chamber (e.g. pressurised vessel) to remain of constant cross-section. This feature applies to a store for storing heat only. For a store that stores cold, maximum insulation is required lower down where the temperature is coldest.

In one embodiment, the store is configured for operation at sub-zero temperatures.

Stores operating to store "cold" at sub-zero temperatures often suffer from larger "specific heat" variations (i.e. the storage media will often undergo larger changes in heat capacity with temperature at lower temperatures than at higher temperatures) than stores always operating above sub-zero temperatures, and hence, such stores benefit more from such tapering.

In one embodiment, the heat storage apparatus is configured such that during charging and discharging the store cycles between at least −10° C. and −50° C., or even 0° C. and −50° C., and in particular between at least −10° C. and −100° C. (i.e. upon charging with "cold" the inlet gas is at −50° C. or colder, or even −100° C. or colder, and upon discharging the inlet gas is at −10° C. or higher).

In one embodiment, the heat capacity of the storage media rises with increasing temperature such that the ratio of specific heat at 373K to specific heat at 273K is more than 1.15, or even 1.25.

In one embodiment, the heat capacity of the storage media rises with increasing temperature such that the ratio of specific heat at 273K to specific heat at 173K is more than 1.15, or even 1.25.

The fourth aspect of the present invention is of especial application in heat stores where a long or varying length thermal front is problematic. A tapered store construction is of benefit in a heat storage apparatus, wherein the apparatus is configured such that, during operation, the flow path of a gas flowing through the chamber from inlet to outlet for transfer of thermal energy to or from the storage media can be selectively altered in response to the progress of the thermal transfer, wherein the chamber is provided with only a single bypass flow passageway extending lengthwise alongside the storage media connecting the gas inlet to the gas outlet, and which is obstructed by a flow controller comprising at least one baffle system adapted to move along and block the passageway so as to divert the gas flow path from the gas flow passageway to different downstream regions, in turn, of the storage media.

In one embodiment, a tapered store may be configured such that gas flow control is achieved using a mechanically simple and centralized arrangement involving a movable baffle system in a bypass flow passageway extending alongside the storage media, which can divert the gas flow path from the gas flow passageway to different downstream regions, in turn, of the storage media. Gas will follow a downstream flow path along the bypass flow passageway in preference to entering the adjacent storage media, which has a higher resistance to flow than the passageway, unless the passageway is obstructed by the baffle system, causing its path to be diverted into the storage media.

Access to the storage media from the passageway may be provided in a number of ways. The passageway may comprise a walled passageway and may have uniformly permeable walls or permeable (e.g. perforated) sections provided at spaced (e.g. regular or irregular) intervals downstream. Alternatively, the passageway may be impermeable but provided with openings or gaps, ports or passageways provided at intervals along its walls. In the case of particulate storage media held within a supporting structure, the passageway preferably also acts as a support column for the supporting structure, especially where a modular system is utilised. However, the passageway may instead be defined by surrounding structures, for example, the storage media (e.g. if monolithic) or structures supporting the storage media (e.g. if particulate, fibrous, etc.).

In one embodiment, minor flow passageways extend laterally away from the main flow passageway at a plurality of respective downstream positions along its length, permitting lateral gas flow through the storage media. The laterally extending minor flow passageways may be located between the respective sections and/or arranged so that they deliver gas from openings in the passageways to between the sections (e.g. directly into a plenum).

In one embodiment, plenums are provided extending laterally away from the main flow passageway at a plurality of respective downstream positions along its length, permitting lateral gas flow through the sections where the storage media is located. Plenums may comprise gaps that are normally just upstream or downstream of the storage media (or its support structure), and the storage media (or its support structure) may be provided in sections, for example, it may be modular. Plenums or minor passageways facilitate even gas distribution across the whole cross section of the storage media thereby allowing the gas to flow evenly through the storage media and hence, minimising or avoiding hot or cold spots.

A tapered store may advantageously be formed in this central core arrangement, where the central main flow passageway is also a load-bearing central support column for the remaining structure. As mentioned above, supply passageways extending radially outwards from the central passageway may optionally be supported by a central column.

In one embodiment, the apparatus is configured, during operation, to divert the gas flow path from the gas flow passageway to respective downstream regions, in turn, of the storage media; these may be overlapping regions or different adjacent regions.

A tapered arrangement may readily be achieved using a "layered thermal store" arrangement, where the storage media and/or its supporting structure is divided into discrete sections or layers capable of being selectively exposed to or isolated from the gas flow path by the baffle system, and disposed at respective downstream positions along the main flow passageway. Thus, the store may be divided into respective individual horizontal layers of thermal storage media arranged around the main flow passageway, at least some of which layers increase in horizontal cross-sectional area with increased distance from the top inlet/outlet of the store.

Some or all of the layers (e.g. lower sections as detailed above) may increase in cross-section. This layered structure may also be supported by a load-bearing central support column.

Where a tapered store construction is used the movable baffle system may be a simple valve of fixed length, because the tapering may be configured so as fully to compensate for the front lengthening that would otherwise occur. The baffle may be supported by one or more cables or rods, and include seals around its perimeter that are suitable for the temperatures of operation.

Alternatively, the tapering may merely be used to reduce the amount of front lengthening down the store, in which case it may still be desirable to use a valve with a length that can be adjusted commensurate with the front. Thus, the baffle valve may for example be a telescopic valve. The valve may comprise telescopic concentric opposed cylinders with independently controllable top and bottom faces, or the valve may be an inner cylindrical baffle that is movable relative to and within an outer annular baffle structure.

The baffle system may be adapted to block the passageway so as to divert a gas flow path into the storage media at an upstream face of the baffle system.

Similarly, the baffle system may be adapted to block the passageway so as to permit a gas flow path to emerge from the storage media at a downstream face of the baffle. The positions of the respective upstream and downstream faces may be independently adjustable.

The apparatus may comprise a control system for selectively altering the gas flow path.

There may further be provided an electricity storage system comprising a heat storage apparatus as described above.

There is further provided a method of operating heat storage apparatus comprising a tapered heat store with a moving baffle system as described above, wherein gas is caused to flow through the chamber from the inlet to the outlet for transfer of thermal energy to or from the storage media, and the flow path of the gas is selectively altered dependent upon the location of a thermal front that is moving through the storage media.

In one embodiment, the flow path is altered to bypass regions of the storage media upstream of the thermal front, in which regions thermal transfer is substantially complete. In one embodiment, the flow path is altered to bypass regions of the storage media downstream of the thermal front, in which regions thermal transfer is minimal. In one embodiment, the flow path is altered such that it only passes through a region of the storage media localised around the thermal front. These path alterations may be carried out independently of one another.

There is further provided a method of operating heat storage apparatus as described above, wherein the apparatus is configured and operated such that during charging and/or discharging of the store, a thermal front moves downstream without significantly changing its length (e.g. preferably not changing by more than 50% of its initial length).

Thermal energy storage apparatus according to any of the four above aspects may form part of any apparatus or system that stores heat or cold. Such systems may comprise heating systems including solar collection systems; cooling systems, including night-time cooling systems, air conditioning systems, or refrigeration systems, including cyclic refrigeration systems based on vapour cycles or gas cycles; or energy storage systems including compressed air storage systems or pumped heat electrical storage systems; or any other systems where thermal storage is involved.

Features described with respect to one of the four above aspects of the invention, may also be used in relation to another aspect, where the use of that feature would clearly not conflict with the teaching of that aspect (even where that combination has not been specifically mentioned).

BRIEF DESCRIPTION OF THE DRAWINGS

The various aspects of the present invention will now be described, by way of example only, with reference to the accompanying drawings in which:—

FIGS. 10a and 10b are perspective views of an alternative valved layer for use in a layered store;

FIGS. 11a and 11b are sectional views of the bistable flap valve of FIGS. 10a and 10b in the open and closed position, respectively;

FIGS. 12a, 12b and 12c are respective perspective views showing how the actuating mechanism operates the bistable flap valve of FIGS. 10a and 10b;

FIGS. 13a to 13d are respective perspective views of a butterfly valve for use in the valved store;

FIGS. 19a, 19b and 19c show how a thermal front progresses down the thermal energy store of FIG. 18;

FIGS. 20a and 20b are comparative figures showing how a thermal front progresses down a non-tapered store with a central main flow passageway containing a variable-length moving baffle;

FIGS. 23a and 23b are schematic cross-sectional views of a valved layer with a sliding screen valve in the closed and open positions respectively, in accordance with the first aspect;

FIGS. 24a and 24b show respective, perspective views from above and below of a single hexagonal tray of a layered support assembly, with optional outer wall, in accordance with the second aspect, and FIG. 24c shows a valved hexagonal tray with a monostable flap valve and optional outer wall;

FIGS. 26a and 26b show respective, perspective views from above and below of a single hexagonal tray of a layered support assembly, without an outer wall, in accordance with the second aspect, and FIG. 26c shows a valved hexagonal tray with a monostable flap valve and no outer wall; and, FIG. 27 shows several hexagonal trays of FIG. 26 in a tessellating and stacked arrangement, in accordance with the second aspect.

DETAILED DESCRIPTION

FIG. 2

The present invention is directed towards improvements in thermal storage apparatus, and is particularly directed at heat stores for use in energy storage systems.

Figure 1:
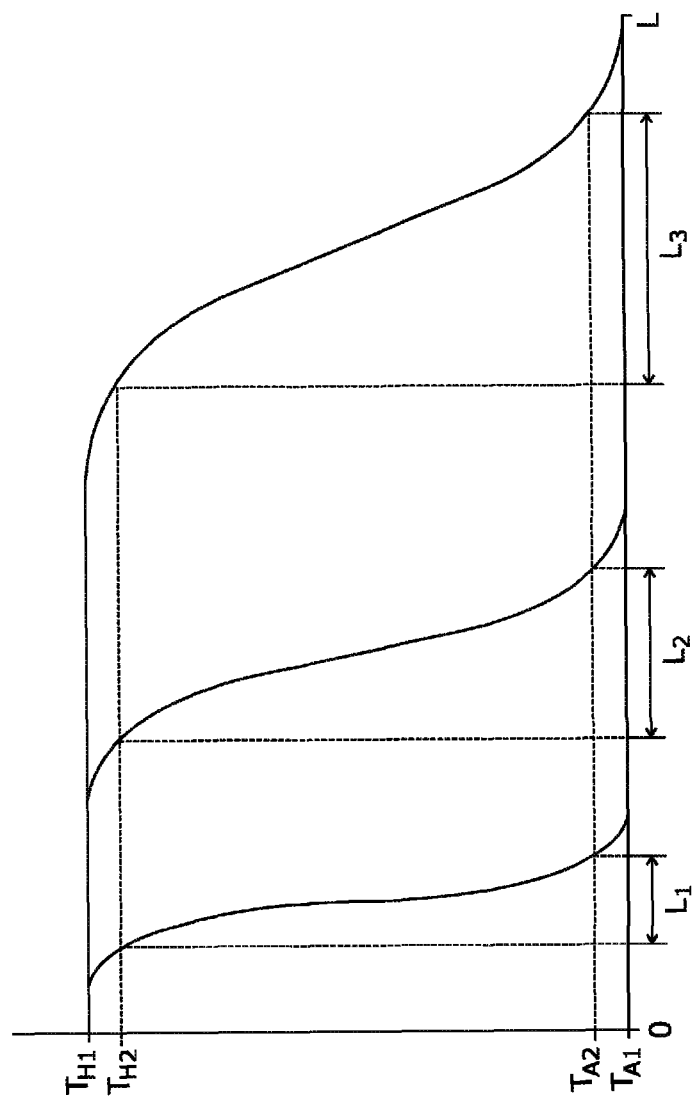
FIG. 1 is a graph illustrating the progress of a thermal front through a thermal energy store.
Figure 2:
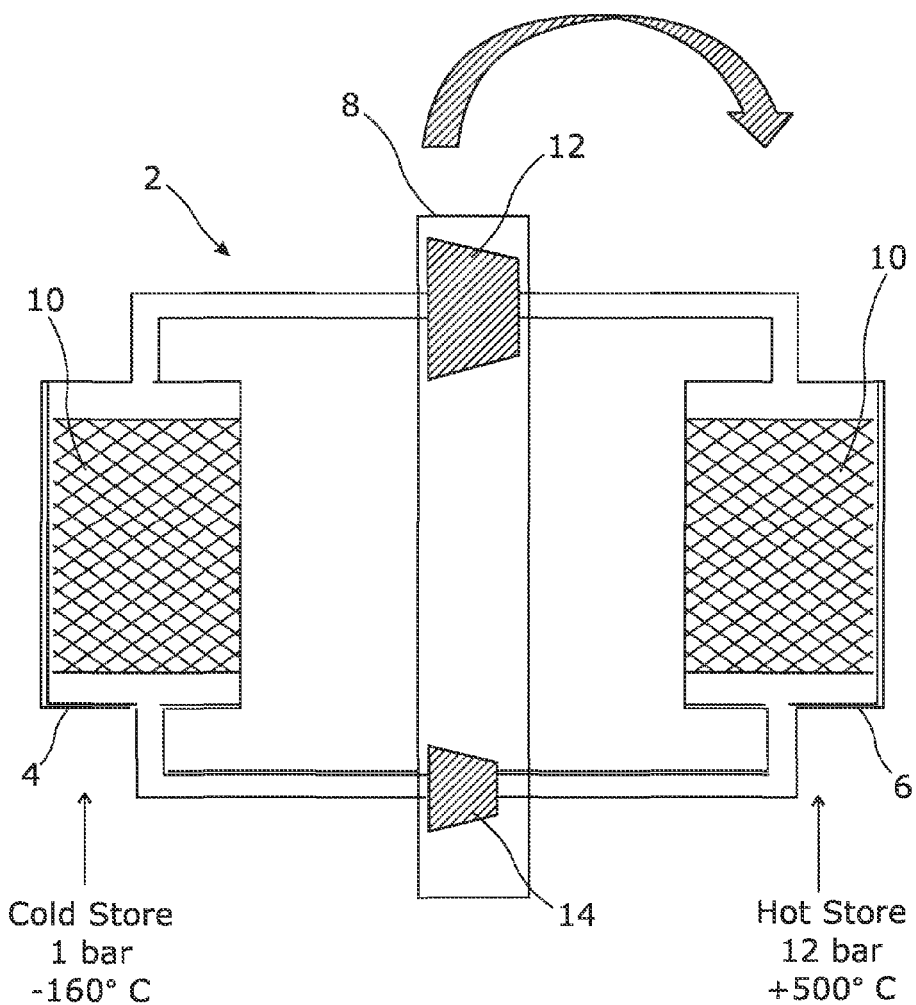
FIG. 2 is a schematic of the gas cycle of a Pumped Heat Electricity Storage (PHES) system.

As explained above, FIG. 2 is a schematic of a PHES system such as is described in Applicant's earlier application, WO2009/044139. That system is more fully described below in order to demonstrate how hot and cold stores may operate in practice.

The system 2 is a reversible, closed cycle energy storage system operable in a charging mode to store electrical energy as thermal energy, and operable in a discharging mode to generate electrical energy from the stored thermal energy. The system comprises respective positive displacement devices 12 and 14, as well as a hot (high pressure) store 6 and a cold (lower pressure) store 4. During charging, device 12 compresses a gas and the hot, high pressure gas then passes through the hot store 6, where it gives up its heat, before being re-expanded in the other device 14 and passing at a lower temperature and pressure through the cold store 4, where it gains heat, and returns to the start of the circuit at its original temperature and pressure. In discharge mode, the gas flows in the opposite direction around the circuit and the positive displacement devices are required to reverse their functions. Gas enters the cold (low pressure) store (the outlet of the store during charging is now an inlet) and gives up heat before passing, at a lower temperature, into device 14, where it is compressed and passed, at high pressure, into the hot (high pressure) store 6 where it gains heat, before being expanded by device 12 and returned to the start of the circuit at its initial temperature and pressure.

The reversible system 2 may conduct a full charging cycle or a full discharging cycle, or may reverse its function at any point of charging or discharging; for example, if electricity is required by the national grid a charging cycle may be interrupted and the stored thermal energy converted to electrical energy by allowing the system to discharge.

The system may also need to remain in a charged, uncharged or part charged state for periods of time, requiring the stores to be well insulated. In this reversible system, the gas may be air or an inert gas such as nitrogen or argon or neon. By way of example, the hot store may operate at a gas pressure of about 12 bar with Argon and a temperature range of 0 to 500° C., and the cold store may operate at near atmospheric pressure and a temperature range of 0 to −160° C.

1st Aspect

FIG. 3

Figure 3:
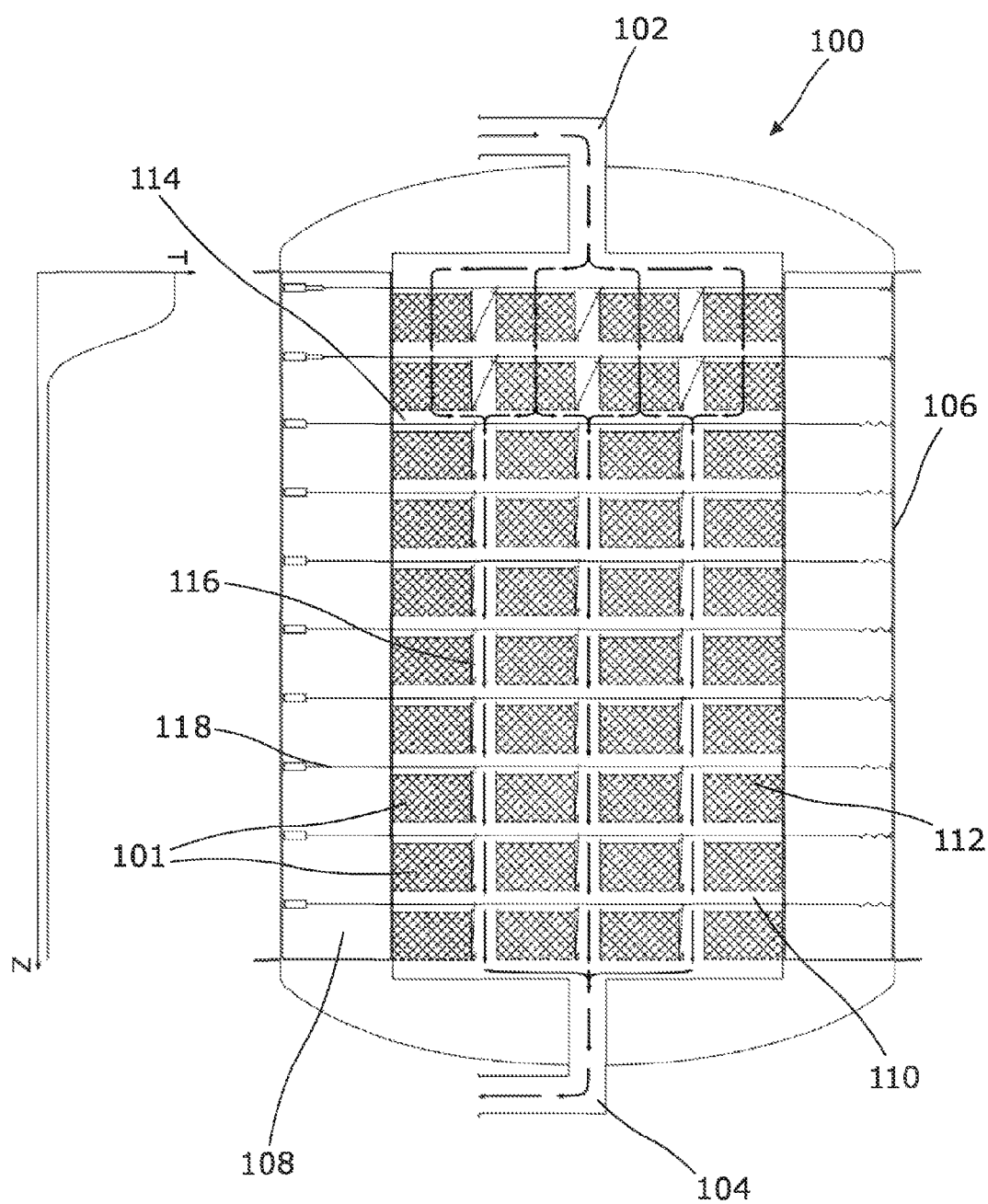
FIG. 3 is a vertical cross-sectional view of a layered thermal energy store with valved layers according to the first aspect.

FIG. 3 is a vertical cross-sectional view through a thermal energy store 100 of layered construction according to the first aspect of the invention. This store is acting as a 'hot' store and is shown just starting a charging cycle.

The store 100 comprises a chamber 106, which for a 'hot' store would be a cylindrical pressure vessel, containing a plurality of layers 101 of gas-permeable thermal storage media 112 arranged successively downstream between a gas inlet 102 and a gas outlet 104, such that gas flows from the gas inlet to gas outlet through the layers for transfer of thermal energy to or from the storage media. All of the layers 101 are valved layers comprising integral valves 116 operable to allow or prevent bypass gas flow through the valve dependent upon the extent of the thermal transfer in that layer. The valves 116 are mounted integrally in the layers, which may comprise solid media (e.g. porous monoliths) or particulate media supported in trays or on other supporting bases, in which case the valves 116 are mounted in the trays or the supporting bases.

By dividing the thermal energy store 100 into a plurality of successive downstream thermal storage layers (i.e. successive respective downstream sections), and then providing one or more valved layers with integral valving, it is possible to control selectively the gas flow so as to bypass thermally inactive valved layers (valves open). An integral valving arrangement (as opposed to dedicated flow passageways) secures the least dead space within the store, which can be important for large stores.

Above the storage media 112 of each layer 101 there is a plenum 114 for lateral gas distribution. Actuator mechanisms 118 for controlling the valves 116 are also preferably mounted above the storage media in the plenum, so as to operate the valves from above, especially where the media is liable to contaminate or jam the mechanisms. Since temperatures in the store can get very high or low, any actuating devices (as opposed to connective components such as links or cables or rods) are preferably located inside insulation 108 which is outside the central layered structure.

The thermal storage layers may form part of a single structure, or a structure that has been assembled in a modular manner. The layers may be assembled a couple at a time or they may be stacked upon one another as individual layers. Preferably, the structure comprises a layered support assembly according to the second aspect in which the individual layers have been stacked upon one another from the bottom upwards. This is described further below.

Usually, the chamber 106 will be an upright chamber with horizontal storage layers 101 arranged above one another through which gas flows vertically. In that case, the store will be configured to operate so that the inlet is provided at the top of the chamber when it is set up as a hot inlet or at the bottom of the chamber when it is set up as a cold inlet (so that the store is always hottest at the top).

FIG. 4

Figure 4A:
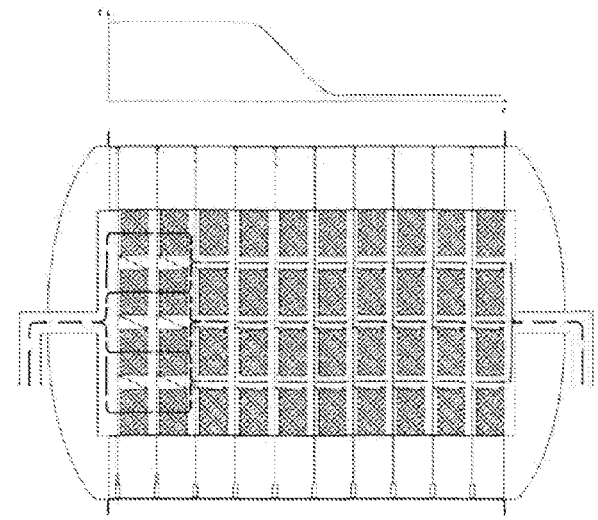
FIGS. 4a, 4b and 4c are cross-sectional views of the layered thermal energy store of FIG. 3 showing operation of the valved layers as the thermal front progresses through the store.
Figure 4B:
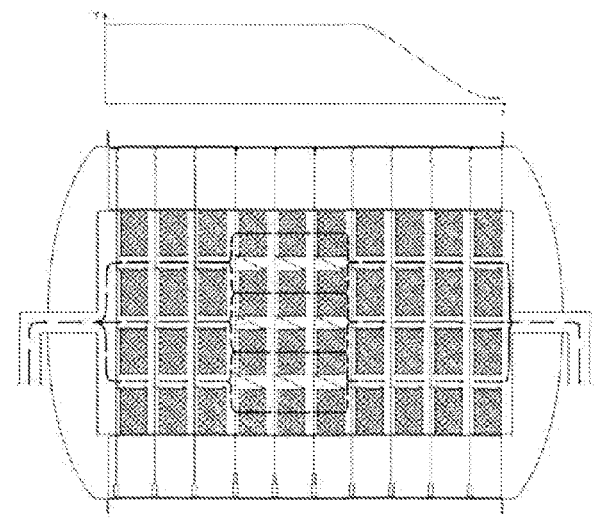
Figure 4C:
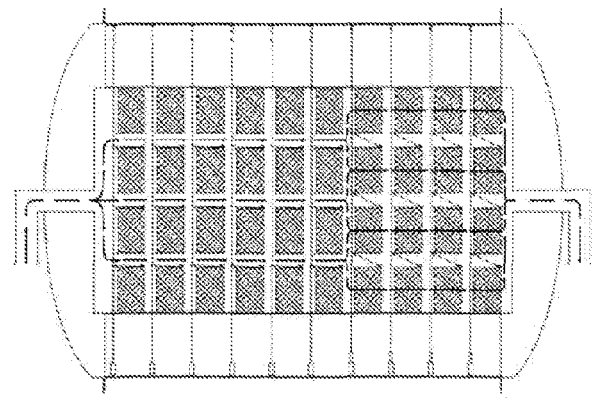

FIGS. 4a, 4b and 4c are cross-sectional views of the layered thermal energy store of FIG. 3 illustrating the operation of the valved layers as the thermal front progresses through the 'hot' store. The graphs show the temperature in the thermal storage media.

In FIG. 4a (corresponding to FIG. 3), the thermal front occupies the first two layers such that active thermal transfer is only occurring in those layers. The valves in those two layers are shut so that gas is forced to pass through the media. Gas leaving the second layer has now cooled substantially to the desired outlet temperature and has no more excess thermal energy. Hence, the valves in the remaining layers are opened so that the gas can flow directly to the outlet, encountering minimal resistance.

FIG. 4b shows the front further downstream when the storage media in the first three layers have reached a temperature close to the hot inlet temperature. As thermal transfer is substantially complete in those layers, there is no point forcing the gas through the media in those layers, and hence the valves in those layers are open to allow bypass flow therethrough. Thus, FIG. 4b shows gas bypassing inactive regions upstream and downstream of the thermal front, such that the gas flow is confined to the storage media only in the vicinity of the thermal front.

FIG. 4c shows active thermal transfer now only occurring in the last four layers of the store, such that all the valves in the upstream layers are open and gas flow is able to bypass the storage media in those upstream layers.

For reasons outlined previously, the front is seen to broaden (c.f. the graphs) as it progresses downstream, from two active layers (FIG. 4a) to three active layers (FIG. 4b) and then four active layers (FIG. 4c), such that there will inevitably be less utilisation in the lower section of the store.

FIGS. 4a to 4c show the 'Hot' store charging. While it may be charged until fully charged, it is possible to reverse the gas flow at any stage during this process and it is not necessary to run the front to the end of the store before starting discharging. (The discharging mode may be similarly interrupted.)

A control logic for controlling the valved layers may be set up that is based, for example, upon the gas temperatures between the layers. Ideally, the opening or closing of valves in valved layers in the vicinity of the leading edge and the trailing edge of the thermal front are independently controlled and ideally, each valved layer is itself independently controlled.

By way of example only, one possible control scheme would be as follows:—

For Charging a "Hot" Store

1) Where $T_{layer\ U}$ is the gas temperature at the exit of the specific layer that is the most upstream layer of a region where active thermal transfer is occurring, i.e. it is measured after the flow has passed through the storage media in that layer and the relevant temperature is just after the gas has passed through the first of the layer of storage media that it is due to encounter (the layers in that active region having their valves shut so flow must pass through the storage media). $T_{inlet}$ is the temperature of the inlet gas to the vessel, and $T_{inlet\ diff}$ is a chosen difference in temperature from the inlet temperature, the valves in that layer should be opened (so that flow starts to bypass the storage media in that specific layer and the trailing edge of the front effectively 'moves down' in to the storage media of the layer below) when:—

$$T_{layer\ U} \geq T_{inlet} - T_{inlet\ diff}$$

i.e. the storage media in the layer is approaching the inlet temperature and thermal transfer is nearly complete. For example, when charging a hot store from 50° C. to 500° C., $T_{inlet}$ is 500° C. and $T_{inlet\ diff}$ may be 10° C., so the valving will open to bypass the storage media in this layer from the flow when $T_{layer\ U} \geq 490°$ C. (i.e. 500° C.−10° C.)

2) Where $T_{layer\ D}$ is the temperature at the exit of the specific layer of storage media that is the most downstream layer of a region where active thermal transfer is occurring (valves are closed and flow must pass through the storage media). It is measured after the flow has passed through each layer of storage media and the relevant temperature is just after the gas has passed through the last of the layers of storage media where active thermal transfer is occurring. This temperature is often very similar to that at the outlet from the vessel $T_{outlet}$. $T_{start}$ is the start temperature of the gas (and solid) in the vessel, and $T_{outlet\ diff}$ is a chosen difference in temperature from the start temperature, the leading edge of the thermal front should be made to move down one layer by closing the valves in the next layer downstream when:—

$$T_{layer\ D} \geq T_{start} + T_{outlet\ diff}$$

i.e. the layer has started to rise noticeably in temperature relative to the start temperature (which is normally the temperature of all the layers below that layer). For example, when charging a hot store from 50° C. to 500° C., $T_{start}$ is 50° C. and $T_{outlet\ diff}$ may be 25° C., so when $T_{layer\ D} \geq 75°$ C. (50° C.+25° C.) then the flow is diverted into the next layer down (the valves in that layer close) and $T_{layer\ D}$ is now measured after that layer. To this end, temperature sensors such as thermocouples may be installed at individual levels within the vessel. Inlet and outlet vessel temperatures may be measured as well, as required.

For Discharging a "Hot" Store

3) Conversely, where flow is reversed, the outlet becomes the inlet and cold gas enters the hot store (from the bottom in an upright store) to cool it, the trailing (or upstream) edge of the thermal front is effectively made to move up one layer by opening the valves in the most upstream layer of the active transfer region (i.e. nearest the inlet) when it has cooled so that the temperature just after the layer is nearly as cool as the (cold) inlet temperature (now present upstream of the active thermal transfer region).

$$T_{layer\ U discharging} \leq T_{inlet} + T_{inlet\ diff}$$

For example, $T_{inlet}$ might be 40° C. and $T_{inlet\ diff}$ might be 10° C., so that $T_{layer\ U discharging} \leq 50°$ C. (ie 40° C.+10° C.)

In this way in normal operation $T_{layer\ U discharging}$ ends up approximately at the same temperature as $T_{start}$.

4) The leading (or downstream) edge of the thermal front is made to move up one layer (by shutting the valves in the next downstream layer which has had bypass flow through it up to now) when storage media and hence the gas leaving the most downstream layer in the active region (nearest the outlet) has managed to cool a certain amount from the (hot) start temperature (as still present downstream in the rest of the store and approximately equal to the $T_{layer\ U}$ of charging section 1) above).

$$T_{layer\ D\ discharging} \leq T_{hotstart} - T_{outlet\ diff}\ (\text{e.g. } 480°\ C. = 490°\ C. - 10°\ C.)$$

FIG. 5

Figure 5:
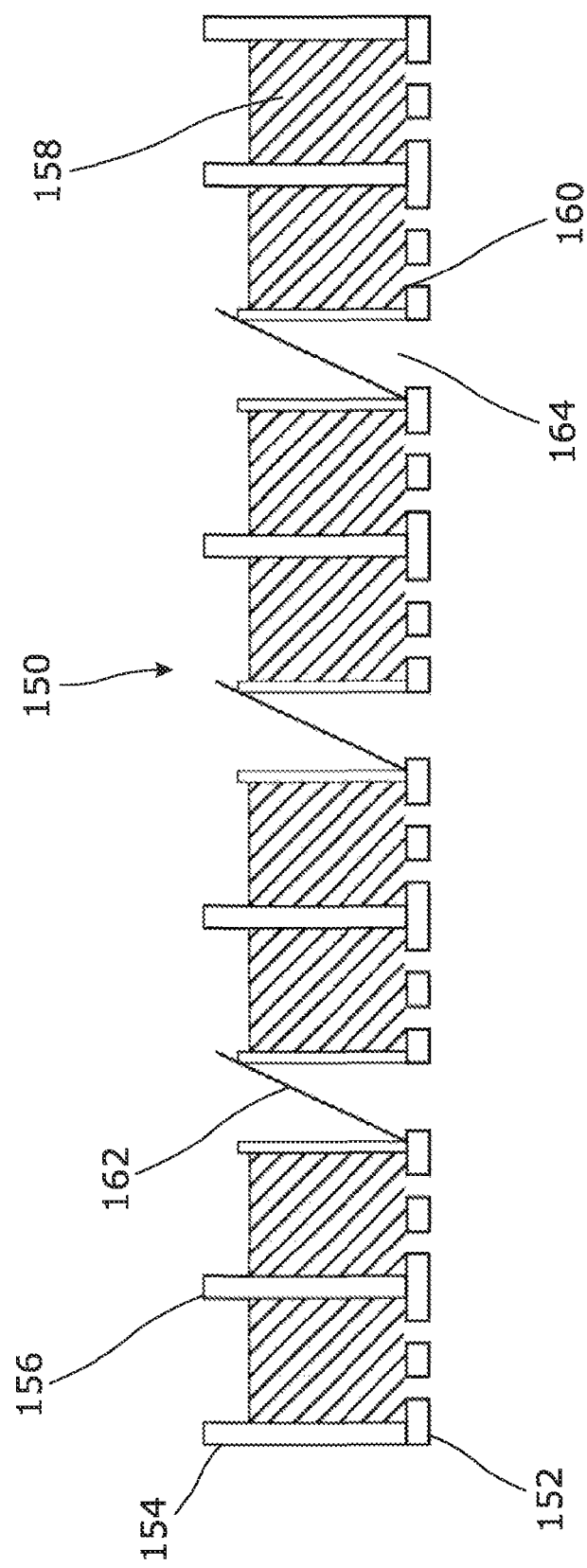
FIG. 5 is a cross-sectional view of a valved layer with monostable flap valves.

FIG. 5 is an enlarged cross-sectional view of a valved layer 150 with monostable flap valves 162 (actuation mechanism not shown), such as shown in the store of FIG. 3. The layer comprises a base layer 152 with pores 160 for gas flow, supporting pillars 156, a supporting wall 154 for retaining the storage media 158, and valves 162.

The monostable valve is shown in the closed position obstructing the bypass passageways 164. The monostable valve could be actuated by a similar mechanism to that depicted in FIG. 3 or described in respect of FIG. 9 below. If the actuator were to fail, it will be appreciated that gravity will act to cause the flaps 162 to fall into the closed position, which is preferred as the result of this will merely be a slight pressure drop across the store.

FIG. 6

Figure 6A:
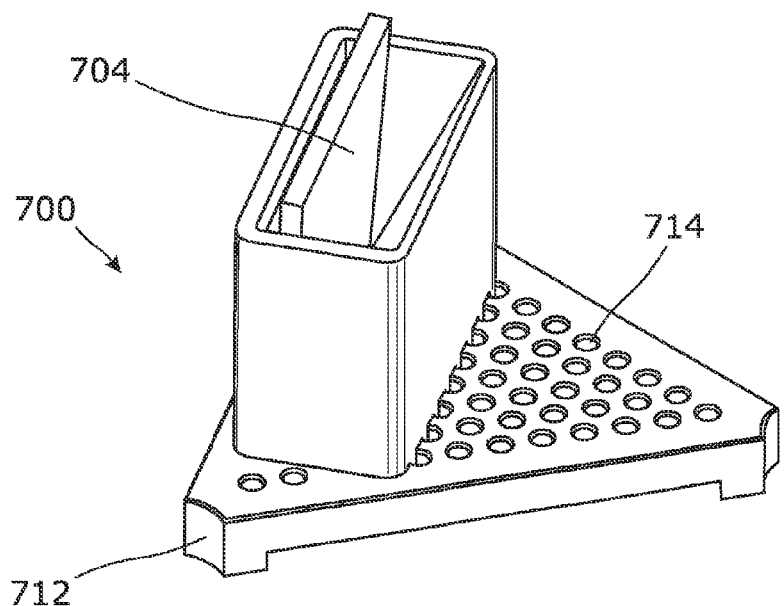
FIG. 6a is a perspective view of a valved tile.

The valved layer may comprise a single base layer or the base layer may be formed from tiles. FIG. 6a is a perspective view of a preferred triangular valved tile 700. The valved tile 700 has pores 714 for gas flow, an upright valve box frame 702 mounted on or integral with the tile, and a valve flap 704 which is pivotally mounted about pivot point 710 in the frame. The valve flap and actuator (not shown) are arranged such that the valve is monostable and will occupy the closed position in the event of any actuator failure (stop 708 prevents the flap from attaining a fully upright position).

Figure 7:
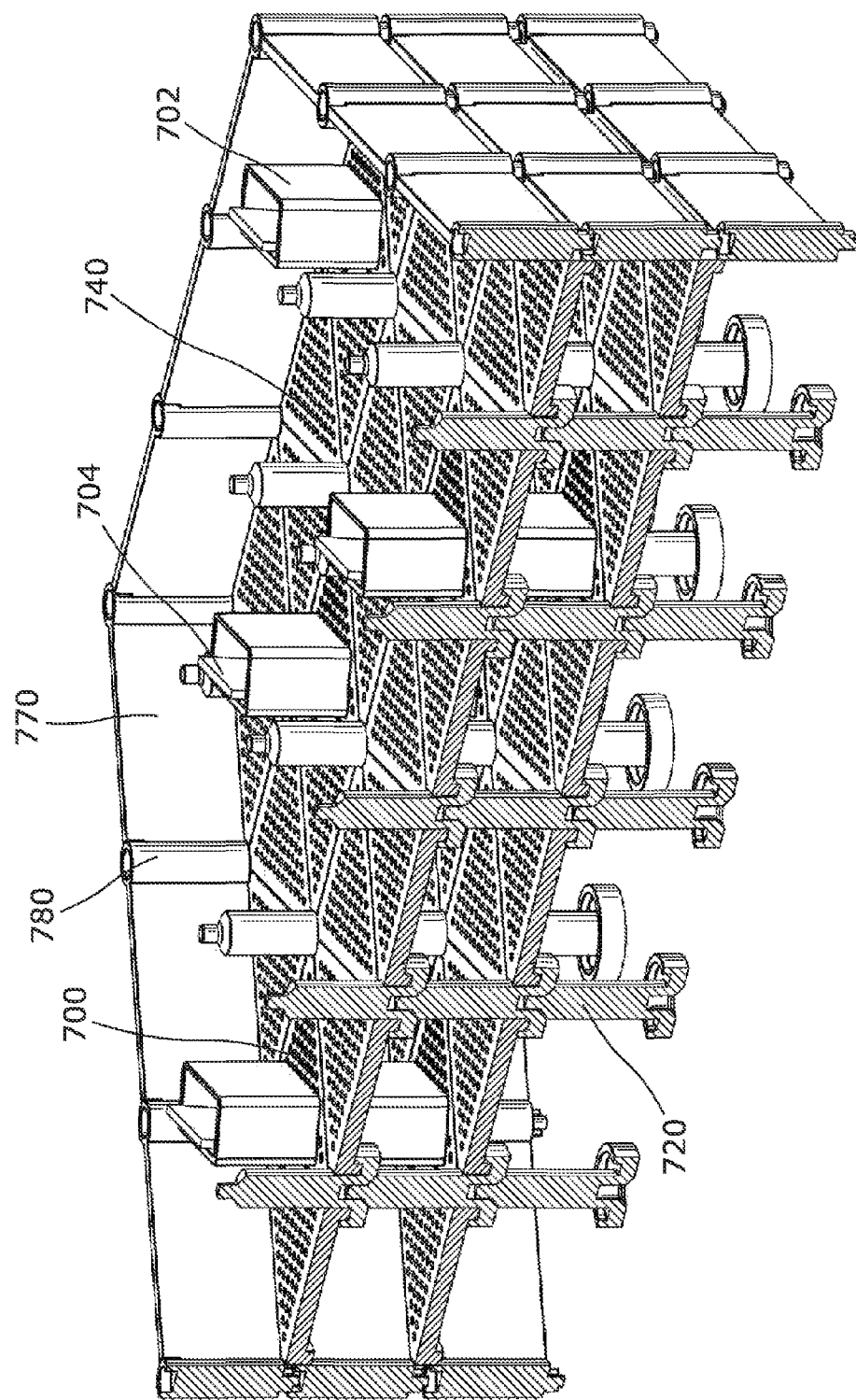
FIG. 7 is a perspective view of a number of valved layers of a layered store of hexagonal cross-section, according to the first and second aspects.
Figures 8A, 8B:
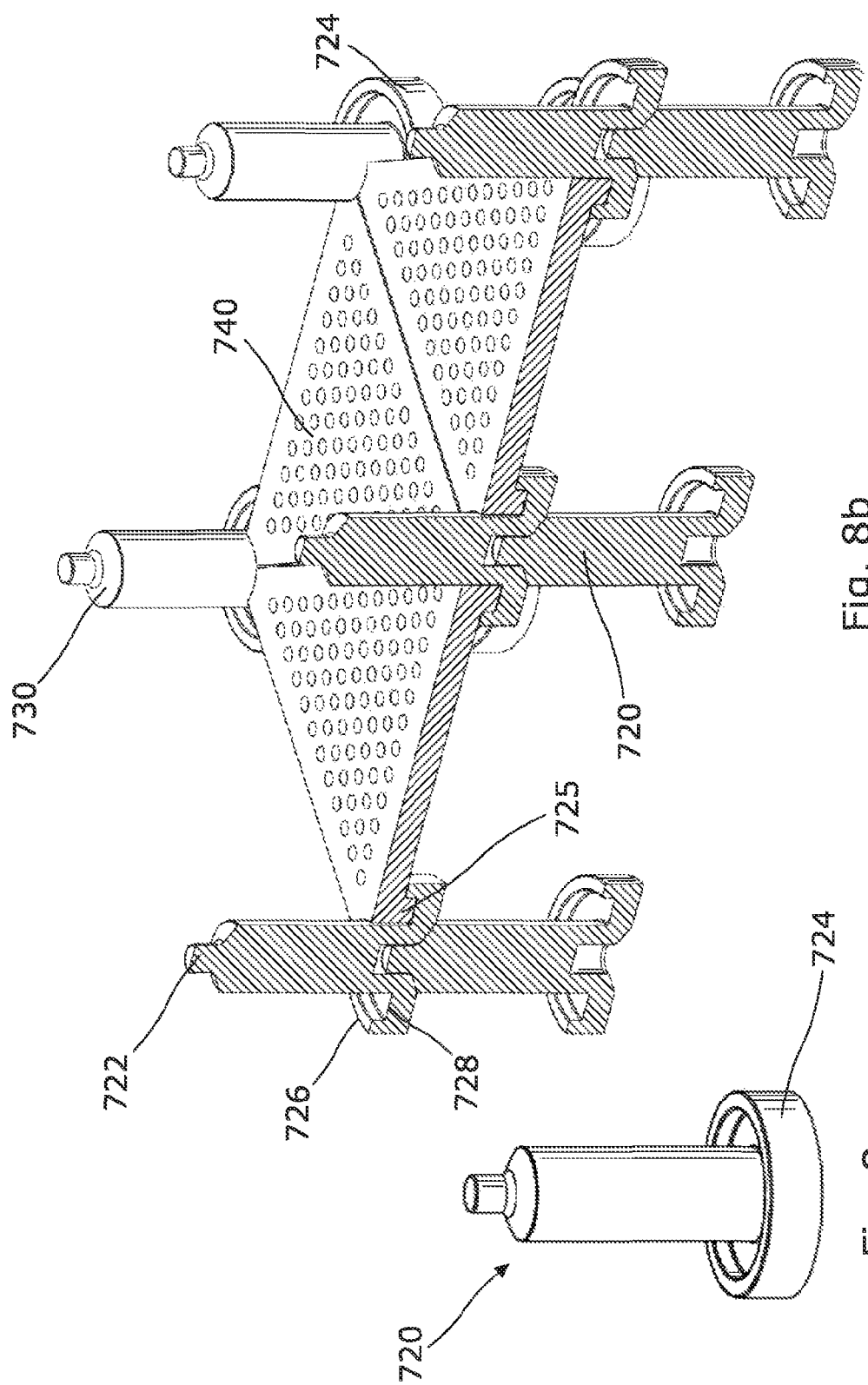
FIGS. 8a and 8b are enlarged perspective views of the pillar and partly assembled pillars and tiles of the store of FIG. 7.
Figure 9:
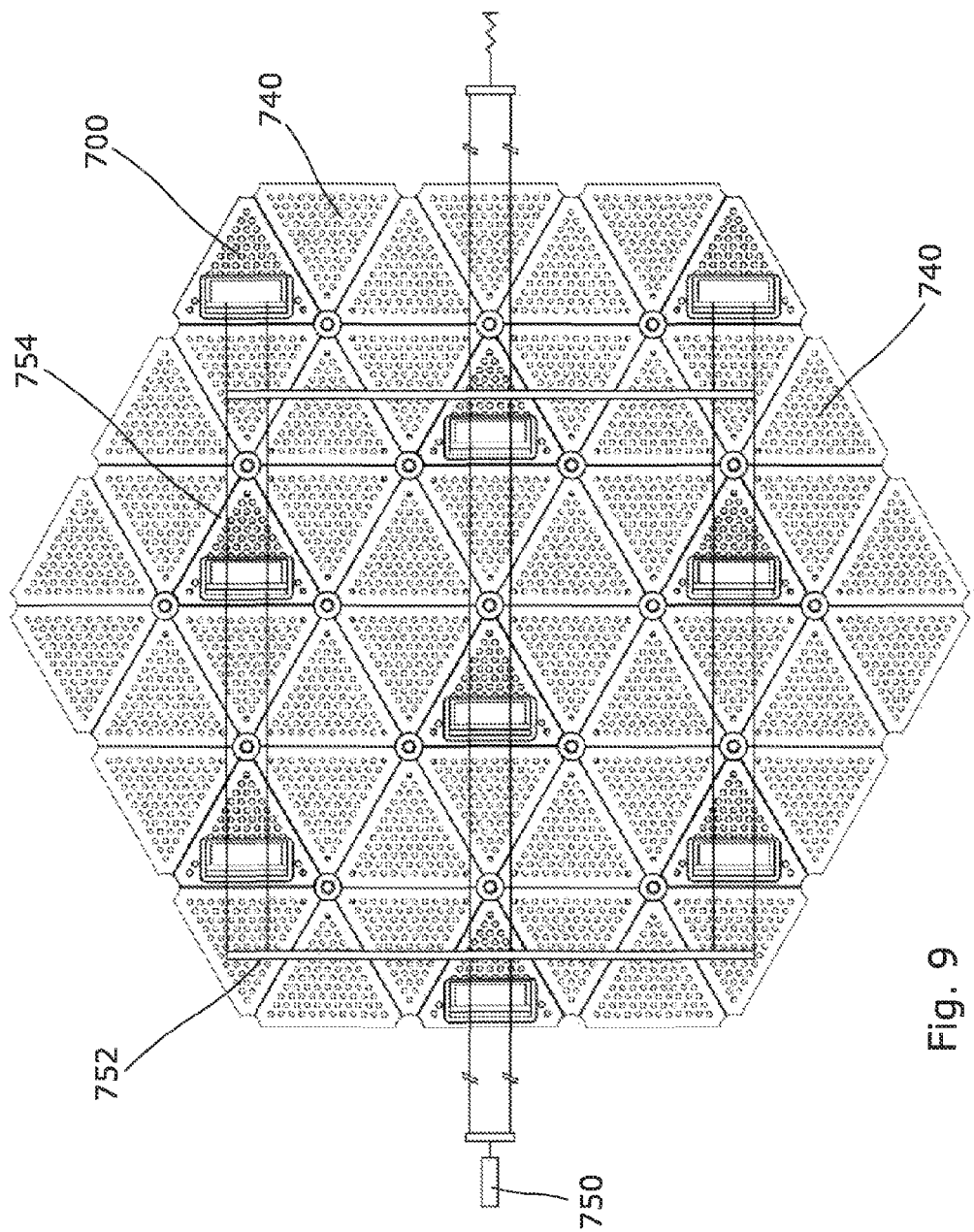
FIG. 9 is a plan view of a valved layer of the store of FIG. 7 showing a schematic valve actuating mechanism.
Figure 14B:
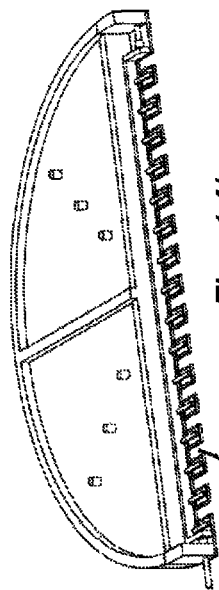
FIGS. 14a, 14b and 14c, 14d are perspective full and partial views of a valved layer with an open slide valve and closed slide valve, respectively.
Figure 14D:
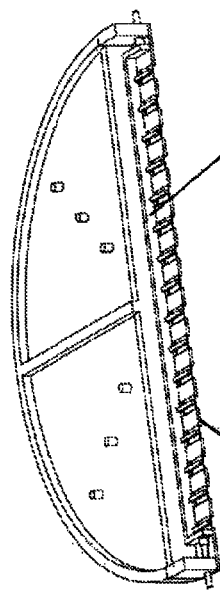
Figure 14A:
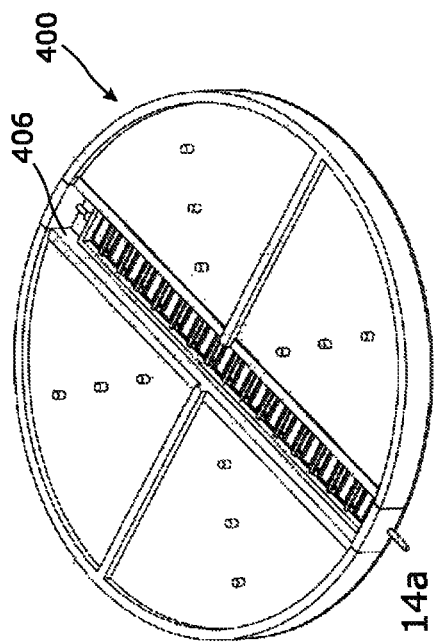
Figure 14C:
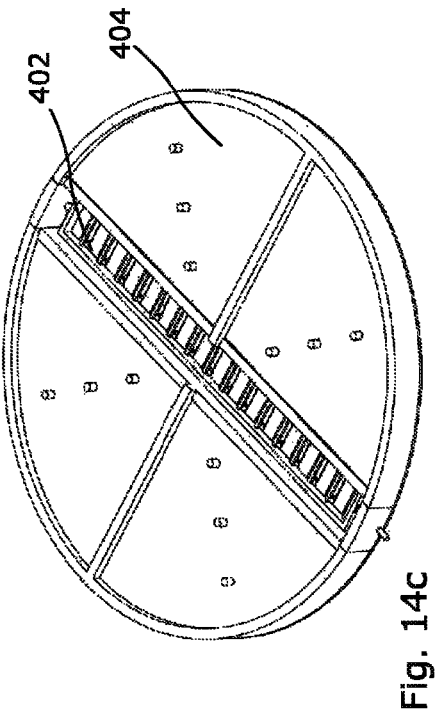

FIGS. 7, 8 and 9 are described below.

FIGS. 10a and 10b

FIGS. 10a and 10b show an alternative valved layer 200 for use in the layered store. The layer 200 comprises a one-piece porous base 202, supporting pillars 210 and an outer support wall 204 for retaining thermal support media (not shown) that would be back-filled into the layer.

The pillars 210 will act to support the next layer above and may be separate or integrally formed with the base layer, and may be aligned with (and preferably seated within) pillars in the layer below.

In this embodiment, four large bistable flap valves 206 are shown extending across the layer, each comprising a movable flap 212 operated by an actuating mechanism 208. That mechanism is mounted across the layer above the level of the storage media so as to protect the mechanism.

FIGS. 11a and 11b

Referring to FIGS. 11a and 11b, these are enlarged sectional views of the bistable flap valve. The valve comprises a thin metal "L" shaped flap 234 comprising a lower panel 234b which pivots around pivot point 238 in the base of a box frame 232, and an upper panel 234a.

In the open position of FIG. 11a, the flap 234 stands upright and the gas can flow through the box frame 232. In the closed position, the flap is tipped over and seals against the sloped sealing faces 236 running around the edges of the frame 232. An advantage of this type of the valve over a sliding valve is that the sloped sealing surfaces are less likely to allow dust to settle on them. The flap is balanced, in this case by bending a section 234a of it backwards, such that the flap's centre of gravity passes over the pivot point at close to the halfway point of its arc. To actuate the valve, it simply has to be tipped over-centre and it will naturally fall into place. The flap 234 is not rigidly attached to the pivot point 238, such that when tipped into the closed position it is be free to align itself flat against all of the sealing faces; the pivot point is additionally shielded from dust contamination dust by the upper panel 234a. This style of valve is effective and reliable, yet simple to manufacture.

FIGS. 12a, 12b and 12c

One possible actuation system for the bi-stable valve 234 is shown in FIGS. 12a to 12c. A connecting rod 240 is used to connect all of the valves, via small tabs 245 on the top of the flap 234a, so that a single actuator can operate all of the valves together. The actuator is a C-shaped hook 242, on the end of a (supported) bar 243 that extends out through the wall of the layer to another actuation system, and it acts on the cross links 246 between the valves at one end of the connecting rod 240. As shown in FIGS. 12a, 12b and 12c, to open the valves, the actuator would move to the left, pushing on the connecting rod 240 until the valve flaps 234 pass over centre and fall into the open position. The actuator would only have to move far enough to push the valve flaps over centre, thus minimising its stroke, and the width of the hook 244a/244b would be such that when the valve flaps fall into the open position the connecting rod cross-link 246 ends up just in front of the opposite face 244b of the hook.

FIGS. 13a to 13d

FIGS. 13a-13d are respective perspective views of a butterfly style valve also suitable for use in the valved store for controlling the flow of gas between the layers. When the storage media comprises particulate media, this type of valve has the advantage that it does not have a lower pivot point in which the media can get trapped: rather, when this valve is opened, any storage media that has collected in the valve can fall clear.

The valve 320 comprises a rectangular butterfly valve flap 300, as shown in FIG. 13a, with a cylindrical central spine 302 that acts as a pivot axis. The flap 300 is mounted within a box frame 304 of rectangular cross-section that has open top and bottom ends, as shown in FIG. 13b, to permit vertical gas flow therethrough. The frame has opposed side walls 306 with a U-shaped protrusion 308 halfway up in which the spine 302 of the flap is pivotally mounted.

Angled flanges 310 extend upwardly and downwardly on the side walls 306 of the frame to provide sealing faces which the flap 300 can seal against in the closed position, while the other pair of side walls 316 of the frame also have diagonally opposed horizontal flanges 312 and 314 on their top and bottom edges acting as further sealing faces.

FIG. 13c shows the assembled valve 320 in the open position. To open the valve 320, the flap 300 is rotated so that it sits vertically in the frame against stop 318, allowing gas to pass either side of the flap. This could be achieved by an actuator pulling on a cable attached to the top of the flap, in a similar fashion to the monostable flap valve.

The stop 318 prevents the valve going over centre. It is desirable to have a monostable valve 320 where the stable position is closed, and this may be achieved by the location of the stop 318 (e.g. slightly off-centre), or by counter-weighting the top half of the flap so that the open position is unstable (e.g. by adding a counter-weight). Since the top half of the flap would need to protrude above the frame when it is attached to an actuating cable, the weighting of the top flap may be achieved by simply making it longer than the lower half.

To close the valve 320, the flap 300 is rotated through some angle (usually between 15° and 45°, preferably about 20°), such that the flap seals against the sealing faces around the edge of the frame. The top half of the flap 300 seals on its lower face (as viewed from above) and the lower half seals on its upper face.

Individual butterfly valves may sit in individual tiles of a thermal storage media support layer, or elongated butterfly valves may sit in troughs that extend across the thermal storage media support layer (e.g. extending across or replacing several tiles).

Any valve in the store needs to be as gas-tight as possible in the closed position. To this end, the spine or spindle could include a boss fully recessed within the frame side walls so that there is no direct leakage path at the pivot, rather the gas has to flow into the recess and out again which increases the pressure drop and improves the sealing.

FIGS. 14a to 14d

FIGS. 14a to 14d show a valved layer 400 with a single horizontal slide valve 402. Each valved layer 400 comprises two semi-circular regions, in which the storage media 404 is held, and which are separated by a central channel 406 free from storage media and in which the valve sits. The valve is shown in the open position in FIGS. 14a and 14b (cross-sectional view), whereby gas can bypass the storage media.

The valve consists of a frame inset in the layer 400 comprising a multi-apertured base plate 408 defining a set of apertures 410. A slidable valve 412 comprises a rigid ladder-like frame supporting a series of individual, flat plates (the plates are sized to cover the apertures in the base plate 408, as shown in the closed position in FIGS. 14c and 14d), and the frame is pushed or pulled by an actuating mechanism (the actuating mechanism would be radially outside the layer and is not shown in figure); the plates are designed to be flexible (e.g. by being attached to the frame via flexures) so as to achieve a good seal against the base plate 408, and to conform to any irregularities. Other valved layer arrangements may also be used in which a set of valve apertures inset in the layer are covered by a corresponding set of individual valve plates supported by a rigid frame and actuated by at least one actuating mechanism.

FIGS. 15 and 16, 17 and 18 to 22 are described below.

FIGS. 23a and 23b

FIGS. 23a and 23b show, as an alternative valve mechanism, a cross-section of a sliding screen valve 420 which may be placed in a layer above the storage media, and extend over the entire horizontal cross-section of a layer.

A lightweight screen valve 420 comprises a substantially flat (preferably metallic), static valve seat 421 perforated with an array of apertures and a valve screen plate 422, also perforated with an array of apertures, resting on the valve seat and configured for lateral reciprocation to open and close the valve. A proportion of the apertures in the valve seat communicate with bypass passageways 423 through the adjacent storage media layer, the remaining apertures communicating with the adjacent storage media 424. With the screen 422 in a first position, as shown in FIG. 23a, the apertures in the valve seat 421 which communicate with the bypass passageways 423 are misaligned with the apertures within the valve screen 422, such that the bypass passageways 423 are blocked by the solid areas of the screen. With the screen 422 in a second position, as shown in FIG. 23b, the apertures in the valve seat 421 which communicate with the bypass passageways 423 are aligned with the apertures within the valve screen 422 such that the bypass passageways 423 are not blocked by the solid areas of the screen. In the said first position the gas flow will pass through the storage media and will be prevented from passing through the said passageways. In the said second position, the gas flow will therefore pass unobstructed through the storage layer, via the said passageways, and will be prevented from passing through the storage media. While the valve plate will include solid areas that cover some of the media (e.g. the valve may only have 20% open area), this would not present a significant flow resistance as compared with the much greater resistance presented by the storage media per se.

2nd Aspect

In accordance with the second aspect of the present invention, a thermal energy storage apparatus is constructed using a layered support assembly for supporting gas permeable thermal storage media, which assembly comprises a plurality of thermal storage layers each supporting thermal storage media and mounted on each other to form a layered stack.

As explained above, the use of a store divided into separate layers provides advantages in terms of being able to select which parts of the store are exposed to the gas flow. However, the construction of a layered heat store can be problematic when the store can exceed, for example, 2 to 4 m in diameter or height, the weight of storage media stored can exceed 50 or 100 metric tonnes, where thermal expansion effects can lead to expansion of the order of decimeters and yet where sealing is required to prevent gas bypass flow. A modular store construction in which layers are built up on top of each other to form a stack (so that lower layers cannot be removed) has been found flexible and effective in assisting with these issues.

Referring back to FIG. 5, a complete storage apparatus can be made up by building successive layers, such as the layer shown, on top of each other, according to the second aspect. These may be added as entire layers (e.g. for small stores), or, the layers may be assembled from components. Each layer 150 may comprise a base 152, pillars 156 (or arches or other vertical supports) for the layer above, an outer wall 154 if the storage media 158 needs to be retained (e.g. where particulate media is used as opposed to monolithic), and optionally valves 162 and any required actuation mechanism. Where load-bearing vertical supports are used, the weight of the upper layers may be carried down through the structure by the vertical supports (loading them in compression only) and the base of each layer only needs to support the weight of the storage media in that particular layer, thus reducing bending loads on the base structure. A modular construction also allows for ease of transport to a site, and subsequent assembly, since a store can be very large.

FIG. 7

FIG. 7 is a perspective view of part of a heat store with a layered support assembly in accordance with the second aspect. The layered support assembly also comprises valved layers and hence, is also constructed in accordance with the first aspect of the invention. (The actuation mechanism is not shown.)

In this preferred embodiment, as in FIG. 5, each layer comprises a base, support pillars (for the next layer) a support wall and integral valving in the layer.

The base of the layer is made up from an array of (equilateral) triangular tiles, with each standard tile 740, or valved tile 700 supported at its three vertices by the pillars 720 from the layer below (see FIGS. 8a and 8b). By using triangular tiles supported at three points, slight differences in the heights of each support can be accommodated, whilst still keeping each tile fully supported. (Three points will always define a plane, but with more than three supports, a plane is no longer defined and uneven loading of the supports and wobbling of the tiles may result.) Since the tiles are equilateral triangles, six tiles can be placed around each support to form hexagons. These hexagons can be patterned outwards to form one large hexagonal base as shown in plan view in FIG. 9 (a few individual tiles will fill in the corners and the supports around the outer edge will only carry two or three tiles). A regular hexagon is the shape that will most effectively fill the cylindrical vessel of the store and can be made up from tessellating equilateral triangles.

FIG. 8

FIGS. 8a and 8b are enlarged perspective views showing how the pillars and (standard) tiles 740 are assembled. Each tile has pores for allowing gas to pass through the base into the layer below, and a concave profile at each vertex to allow it to be placed around a cylindrical pillar 720. On the underside of each tile, at each vertex, locating lugs 725 are provided. These locate into a matching 360° annular recess or channel 728 provided in a base or foot 724 on each pillar, which channel is surrounded by a circumferentially (360°) extending annular ledge sized to abut and support the remaining underside of the tile. These lugs 725 allow for more accurate locating of the tiles on the pillars and help tie the whole structure together, by making the tiles act as cross-links between the columns of pillars. It is also advantageous to seat the tiles in a 360° footwell, as this provides robust anchoring to the pillars such that they should not be dislodged by subsequent backfilling with storage media. The pillars (or interlayer supports) 720 each comprise at their top ends a spigot 722 that is received in a corresponding bore in the foot portion 724 of the pillar above so as to stack the pillars on top of one another. Hence, the pillars are aligned throughout the store forming supporting columns. There is also no possibility, with this arrangement (i.e. no exposed recesses) that the subsequent backfilling will interfere with the mating fit between pillars mounted on each other (since the media cannot contaminate the posts 722).

The tiles may also include stiffening ribs on their undersides to help stiffen the tiles and reduce bending when loaded with storage media. However, the load that each tile will have to support should be quite low and only correspond to the weight of the storage media directly on top of it.

In order to minimise resistance to the gas flow, the pores in the tiles 740 may be similar or larger than the mean particle size of the storage media, in which case a fine mesh (most likely of stainless steel) would be placed over the base to prevent particles from falling through into the layer below.

Figure 6B:
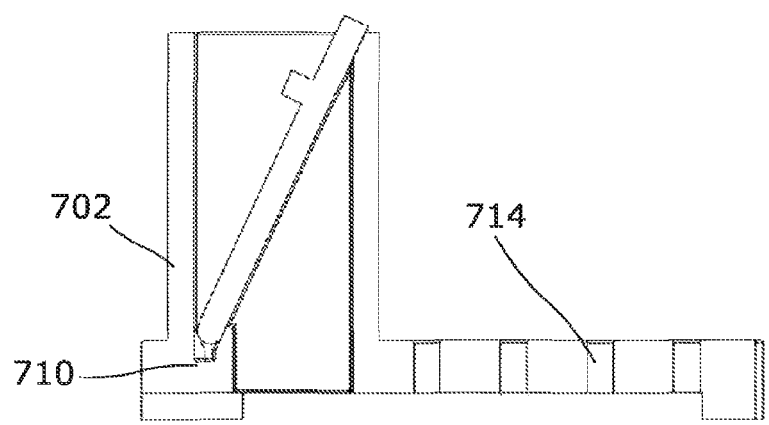
FIGS. 6b and 6c are sectional views of the valve closed and open, respectively.
Figure 6C:
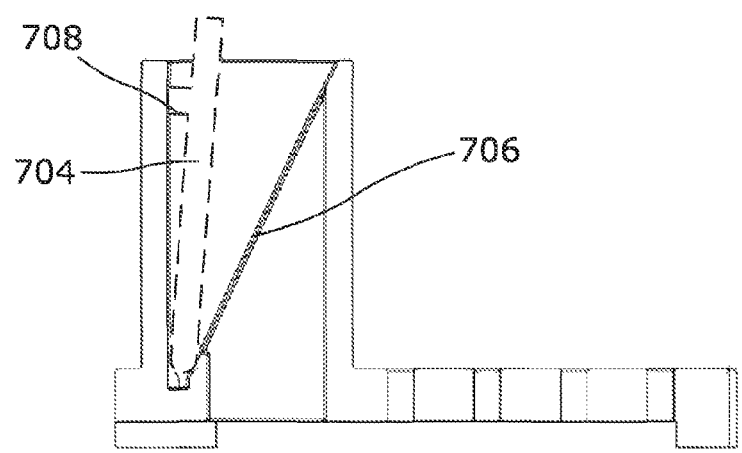

The valving in the layers is provided by valved tiles 700, which have been described in relation to the first aspect above (c.f. FIGS. 6a to 6c) and which are aligned in the respective layers so as to provide aligned passageways with the valve openings communicating with the plenums between the layers.

FIG. 9

FIG. 9 is a plan view of a hexagonal valved layer showing the valve actuating mechanism for operating the valves. The mechanism comprises a single actuator 750 which would be mounted in the insulation outside of the layered support assembly. Each valve would be operated by a pair of cables 754 pulling equally on both sides of the top of every valve flap, the pairs of cables being attached to orthogonally disposed connecting rods 752 which are moved by the actuator either directly or by linkages. Preferably, the connecting rods and cables of the actuating mechanism form a whiffletree frame or equalising frame, namely, a mechanism in which forces are capable of being evenly distributed through linkages and comprising at least one equalising sub-frame pivoted at a pivot point at or near its centre, although further pairs of triplets of equalising sub-frames may be provided downstream; thus, when a force is applied to the pivot by the actuator, an opposing force is applied from the valves through the equalising frame linkages which improves multiple valve actuation.

The entire actuating mechanism may be located in a layer in the plenum above the storage media (as shown in FIG. 3). Preferably, the valves will be opened by the actuator 750 pulling on the cables. To close the valves, the actuator releases the force and the valves will naturally (or with the aid of a return spring return to their closed position.

FIG. 7 (Continued)

FIG. 7 also shows a wall structure 780/770 to contain the storage media on each layer. The wall may be made up of series of interlocking pieces which consist of a cylindrical posts 780 (similar to the central supports) with a flat section 770 extending from them. The cylindrical posts 780 also have a slot in them, into which the flat section 770 of an adjacent wall piece can locate. Similar to the central supports, the wall posts 780 on one layer slot into the posts of the layer below by virtue of downwardly extending spigots on their bases and a matching bore in their upper faces. The storage media will generate an outward pressure on the walls, causing the flat sections to press against the inner edges of the slot in the post to which they interlock. This should provide a reasonably good seal to prevent gas flow out through the walls at these points. To seal along the top edges of the walls, a thin layer of heat resistant felt (e.g. basalt) could be laid down to act as a gasket and sandwiched in place when the next layer is put down.

Particles packed against a smooth wall will generally present a lower resistance path for gas flow compared to that through the particles away from the wall. In the stores this effect might cause the gas to preferentially flow down smooth surfaces and bypass much of the storage media. Texturing the vertical surfaces with a surface effect or texture will increase the flow path along them and prevent undesirable edge flows.

The store structure may be made out of metallic components (e.g. mild or stainless steel) for example for a store storing "cold", but metal presents several difficulties, especially at elevated temperatures, such as creep or thermal expansion. Steel will expand by about 1% between room temperature and 500° C., so a 2 m diameter store for example will expand by about 2 cm. This level of expansion could present problems such as stretching or tearing of the insulation around the store, or distortion of the structure, especially since the structure will not be heated uniformly (a wave of expansion will pass down the store as the thermal front passes down the store).

Preferred materials from which to build the store structure are castable materials which can be made into suitable structural components for the hot or cold store structures. Hot stores would use castable refractories; preferred castable refractories are low cement castables, ultra-low cement castables or no cement castables. These three types of castables have been classified by ASTM as: Low Cement containing 1.0% to 2.5% CaO; Ultra-Low Cement 0.2% to 1.0% CaO; No Cement Castables with up to 0.2% CaO. These materials are commonly used in the steel industry for lining kiln cars and furnace doors. They have many properties which make them well suited to the store structure such as high service temperature (>1000° C.), high compressive strength (60-MPa), good tensile strength (80-300 MPa), low thermal conductivity (1-2 W/m-K), and very low thermal expansion (0.4-0.7% between room temperature and 1000° C.). The low thermal expansion makes these materials particularly appealing, since it essentially removes all the problems associated with the larger expansion of metallic materials. Low thermal expansion also makes them more resistant to thermal cycling, which is beneficial for the stores. Since these materials are also castable, many different shaped components can be easily mass produced from these materials, including the tiles, pillars, valve frames and wall sections.

Although these materials are designed for high temperature use, they may also be used for the internal structure of the cold store. The main concern for the cold store is residual water in the materials freezing and causing cracks to develop. However, these particular materials (i.e. refractory concretes) are made with a relatively low amount of water (approx. 8%, compared to about 20% for regular concrete) and they can be fired after casting to remove residual water.

To build a layer (on top of an existing layer), the supports would first be placed on top of the supports of the layer below and then the standard and valved triangular tiles would be put in place. After laying down all the tiles, the outer wall would be put in place and the metallic mesh would then be laid down. Finally the storage media can be poured into the layer and raked level.

Since all of the components in this embodiment will be relatively small and light, cranes or heavy lifting equipment should not be needed. Another advantage of a modular store construction is that the height of the store is not fixed and layers can be added to match the required thermal storage capacity. If necessary, supports in the lower layer may need a larger diameter than those in the upper layers to reduce compressive stresses resulting from the increasing loading.

While the layered support assembly has been described with flow controllers comprising valved layers, other flow passageways and associated flow controllers may also be provided at selected intervals downstream in the chamber that allow selected downstream layers of the support assembly to be isolated from or exposed to the gas flow path. The flow controllers may be configured to act automatically e.g. in response to detected temperature changes from inbuilt sensors, or be controlled by a control system that selectively alters the gas flow path during operation, for example, dependent upon the location of the thermal front. The control system may include sensor or other feedback systems that provide information to the control system as to the extent of progression of the thermal transfer within the storage media; these may be provided inside/outside the thermal store along its length to monitor the position of the thermal front inside the chamber and/or at the exit to measure the exiting gas temperature.

Figure 15:
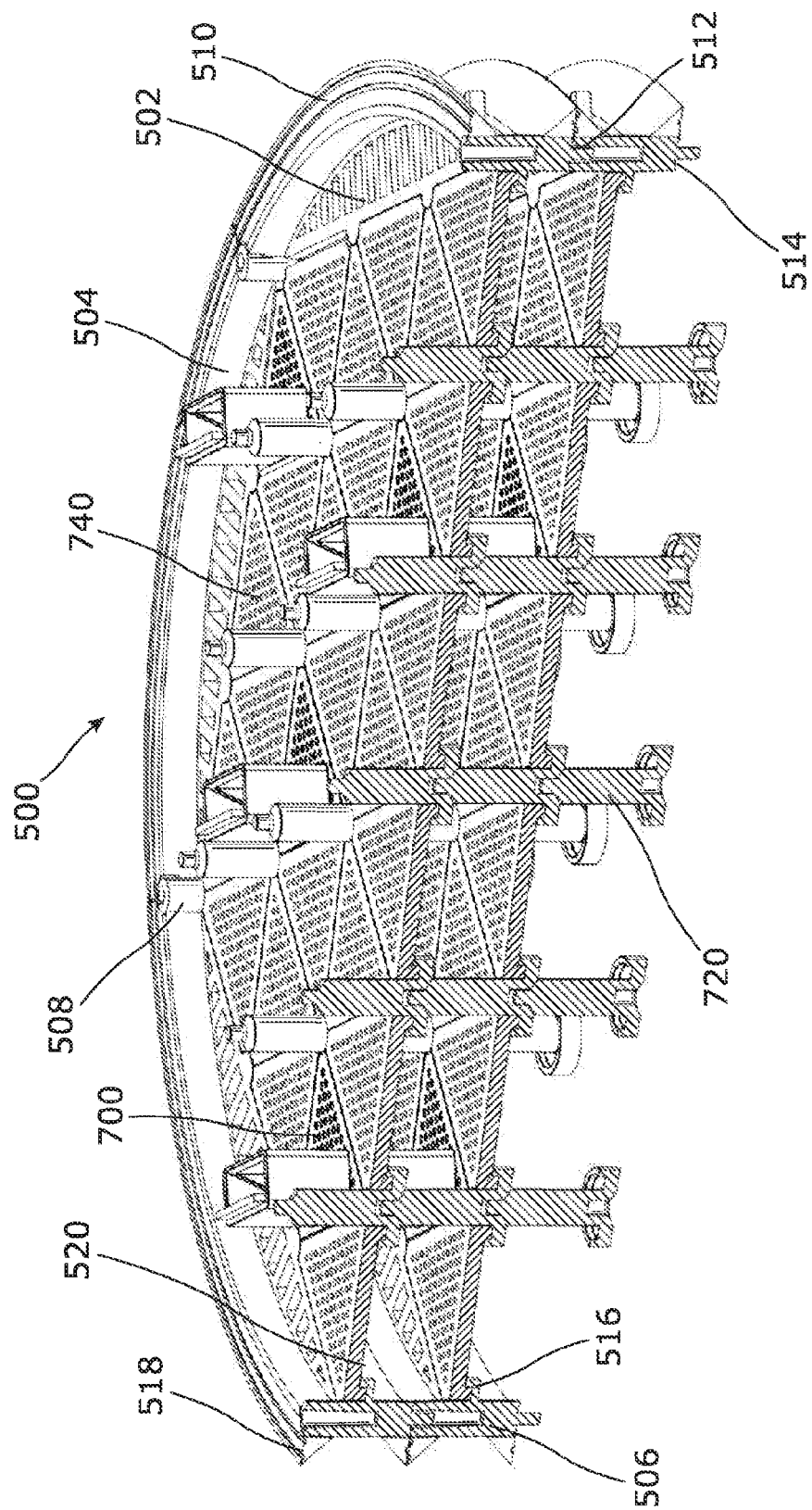
FIG. 15 is a perspective view of a number of valved layers of a layered store of circular cross-section according to the first and second aspects.
Figure 16:
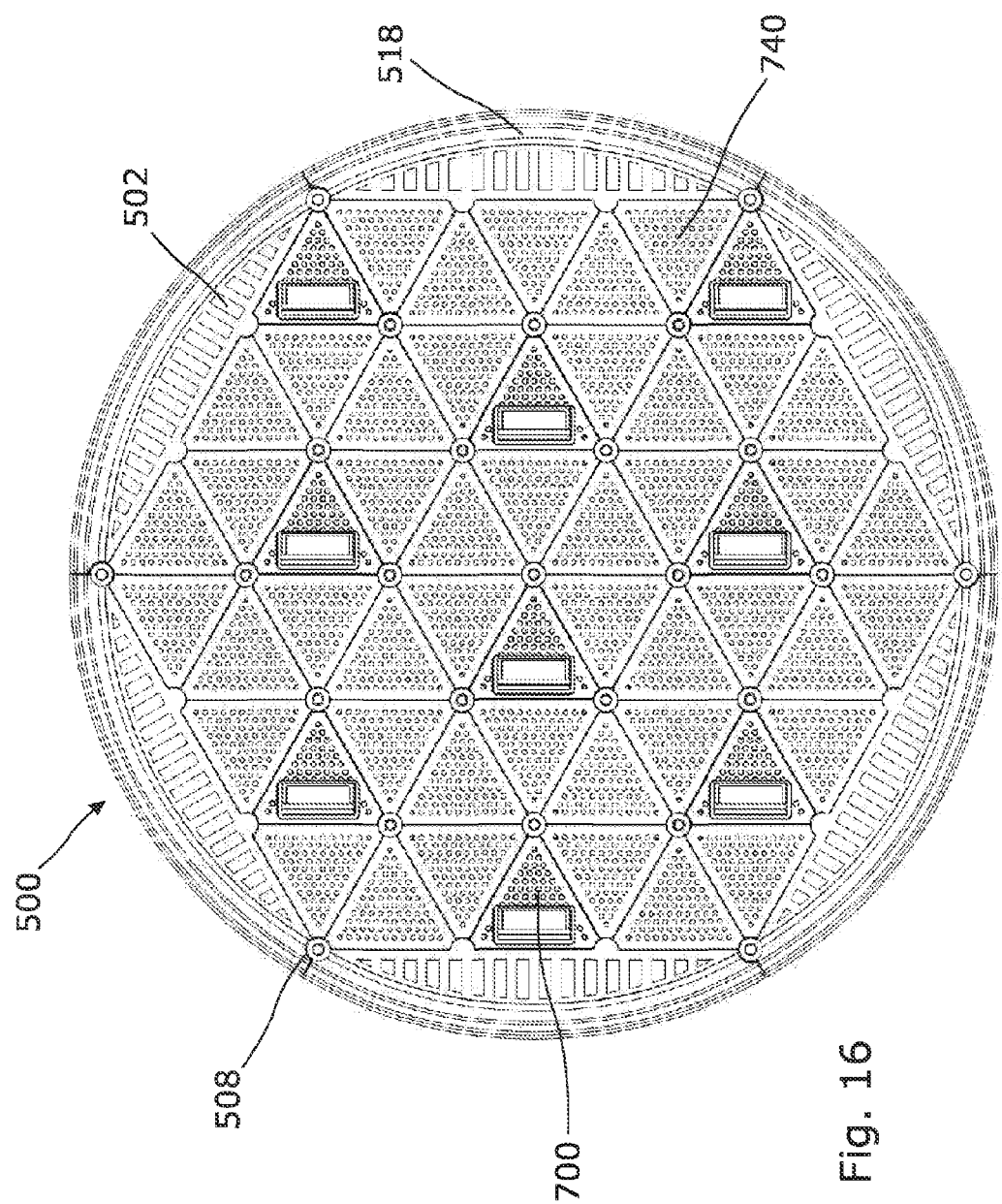
FIG. 16 is a plan view of a valved layer of the store of FIG. 15.
Figure 17:
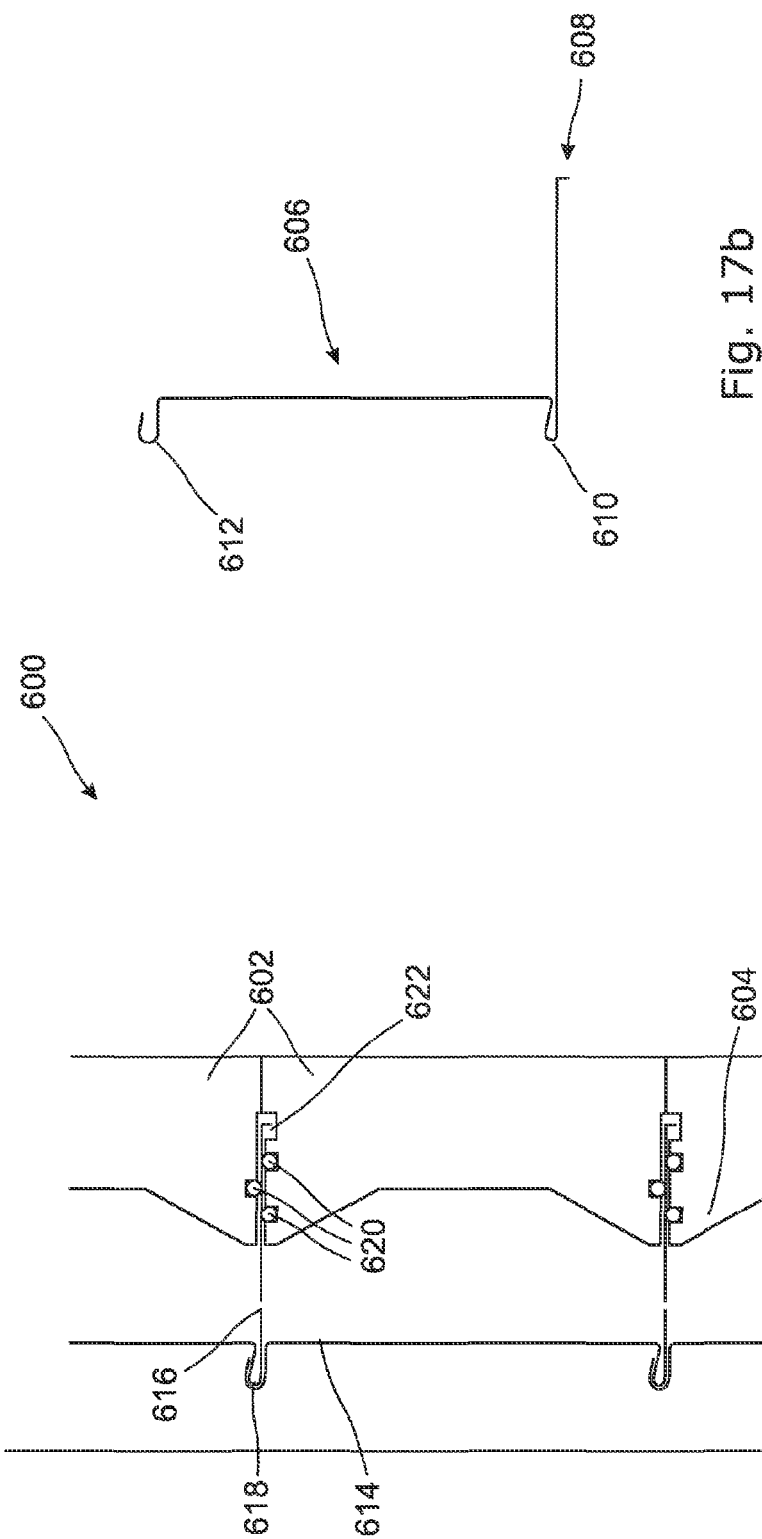
FIG. 17a is a sectional view of a gas-tight jacket attached to the edge of a layered support assembly.
FIG. 17b is an enlarged view of an "L" shaped component that forms the jacket, in accordance with the third aspect.

FIGS. 15 and 16

FIG. 15 is a perspective view of a number of valved layers of a layered store assembly 500 of circular cross-section, according to both the first and second aspects.

The layered support assembly 500 is similar to that of FIG. 7 with both porous standard tiles 740 and porous valved tiles 700 interlocking with and supported by pillars 720 to form a self-supporting structure. However, the periphery of the layered assembly has been adapted by the introduction of curved porous integral base/wall segments 502/504 to modify the hexagonal cross-section to a circular cross-section, as may be seen in FIG. 16, which is a plan view showing the six wall segments 502/504.

The curved wall segments 504 include a downward spigot 514 on their lower faces that is received within a corresponding bore 512 on the upper face of the wall segment 504 in the layer below, so that the wall segments stack one upon the other. In a similar fashion to the support pillars, recessed ledges 516 are provided on the wall segments so as to interlock with and support the tiles at their vertices.

The wall segments 504 have wide upper and lower faces 510 that provide a large sealing interface surface when they are stacked upon each other. This horizontally extending interface is arranged to be below the level of the storage media in a layer (once the layer is back-filled) so that any gas that tries to leave the central structure via gaps in the interface will still have to pass through the storage media. The sealing faces have several grooves 518 in them provided with seals (not shown) and may also interact with a gas-tight jacket which may be sandwiched between the wall segments and supported by them, to provide a further obstacle to gas escaping. This is described further in FIGS. 17a and 17b below.

FIGS. 17a and 17b

FIGS. 17a and 17b illustrate a preferred concept for sealing the thermal storage layers within a gas-tight jacket 600 that limits vertical bypass flow between the periphery of the thermal storage layers and the chamber interior wall 617. The jacket is described with respect to a layered support assembly, as described above.

As a result of the energy required to push gas through the storage media, there will usually be a pressure difference between the two ends of the store. Therefore, gas that can escape into the area surrounding the central structure may use this space to flow the length of the store and bypass the thermal storage layers. The purpose of this edge sealing concept is twofold; firstly to provide a gas tight seal at the interface between adjacent layers' wall sections, thus minimising the escape of gas from the central structure; secondly, to minimise the length of store that can be bypassed by any gas that does escape.

FIG. 17a shows a schematic view of the store edge sealing concept utilising a thin metal (e.g. mild or stainless steel, 0.5-1 mm thick) membrane 614 which seals to and surrounds the central structure of the store, namely, supporting walls 602. The jacket or membrane 614 is made up of individual circumferentially extending sheet metal membrane sections 606, with an L-shaped cross section, as shown in FIG. 17b. The metal sections 606 are formed into concave curves (in order to follow the circular outer wall of the central structure) with the use of a roll bending apparatus and adjacent sections could be welded together along vertically extending seams.

As each layer of the store is built up, the horizontal part of a sheet metal section 606 is sandwiched between the concrete wall 602 of the current layer and the layer above (see FIG. 17a). The concrete wall pieces 602 have wider upper and lower sections 604, for increased support and sealing, which have several grooves in them provided with seals 620. When the sheet metal horizontal section is clamped between the wall pieces 604, the seals act to minimise gas from escaping at the wall interface. Since the metal is thin, it may deform slightly around the groove/seal for improved sealing. This method of edge sealing should also allow relative movement of the adjacent wall sections, resulting from thermal expansion/contraction between respective storage layers as the thermal front progresses through the store. If either of the wall sections 602 moves relative to the other, it should just be able to slide over the metal, but without affecting the gas seal.

The inner edge of the horizontal part of the metal includes a downward flange 608 that is loosely located in another groove 622 in the upper face of the widened concrete wall 604, thus allowing any movement or expansion/contraction of the metal to be accommodated.

The L-shaped metal sections 606 of each layer are joined to each other using a 'standing seam' joint. To this end, at the top and bottom of the vertical part of the sheet metal sections 606 there are provided overlapping curved profiles 612 and 610. The curved profile at the top of one section 612 overlaps the curved profile 610 at the lower edge of the section above. A tool called a 'seamer' is an then run around the outside of the metal sections 606 to 'zip up' the joint, making it gas tight and preventing gas from escaping.

Any gas that does escape through the inner (concrete wall) seal 622/620 at a particular layer will be prevented from passing any further than the next layer along the store by the seals at that next layer. Some small diameter (1-2 mm) breather holes 616 are provided in the horizontal parts of the metal in order to allow pressure equalisation between respective sections inside the jacket, but their small diameter would introduce enough resistance to prevent excessive bypass flows along the length of the jacket.

FIG. 18

Figure 18:
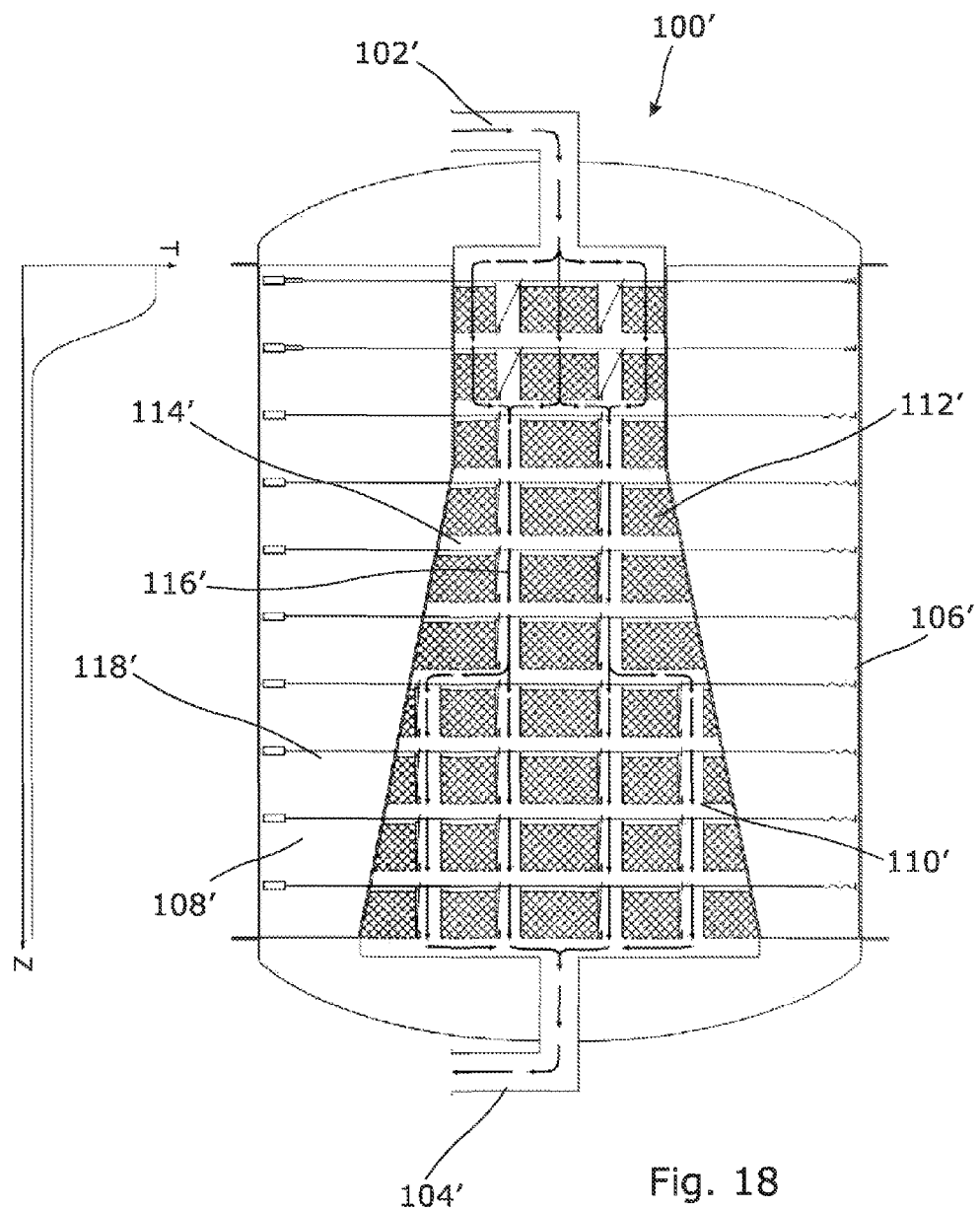
FIG. 18 is a schematic sectional view of a partly tapered, layered thermal energy store with valved layers according to the first, second and fourth aspects.

FIG. 18 shows a thermal energy store 100' with valved layers in a layered support assembly similar to that of FIG. 3, except that it is partly tapered. After the top two layers of storage media, the next eight layers of the assembly taper outwards in cross-section from the top of the store in order to accommodate more storage media 112' in each layer, and hence, control front lengthening. The amount of insulation 108' within the chamber 106' reduces with distance from the top after the top two layers.

FIGS. 19a, 19b and 19c

FIGS. 19a, 19b and 19c show how the thermal front progresses down the store without any noticeable lengthening of the thermal front, which remains at two active layers throughout the store.

FIGS. 20a and 20b

FIGS. 20a and b are comparative figures showing sectional views of how a thermal front progresses down a non-tapered store with a central passageway for bypass flow, where the flow pattern is controlled by a variable-length moving baffle, which can move down the passageway with the front and allow flow to access or bypass a selected adjustable number of adjacent layers. This embodiment is not within the scope of the fourth aspect of the invention since the store is not tapered, but is showed for comparative purposes.

FIGS. 20a and 20b show the store in operation with 3 and 9 active layers 800, 802, respectively, formed by relative movement downwards of an inner solid cylindrical baffle 804 within an outer, annular baffle structure 806. The latter is shown with a partly shaded portion as it is configured (in this example) to indicate that that portion is solid. It is therefore impermeable to gas flow laterally in the solid area and can block the passageway from gas flow on its own; the rest of the annular structure 806 is open but with horizontal solid partitions as before. Neither the open structured portion of baffle 806 nor the solid cylindrical baffle 804 can block gas flow on their own, but when aligned with one another they can do so in the passageway. Thus, the store must use a minimum of three active layers for thermal transfer at any one time in this example.

Thus, referring to the graphs, as the thermal front moves down the store it broadens, that is, the number of layers where thermal transfer is active increases and the separation distance between the start and finish of the thermal front increases. Because a moving baffle valve is being used with an adjustable length, it is possible to move the valve with the front and to match its length to the length of the thermal front so that the upstream layers, for example, are not bypassed prematurely. Thus, FIG. 20a shows the store early in the charging cycle when the thermal front is still near the top of the store and only extends over three layers where there is active thermal transfer. Later on, when the front has progressed further downstream, it has broadened such that thermal transfer is active over 9 layers and the valve has extended to match this length.

Figure 21B:
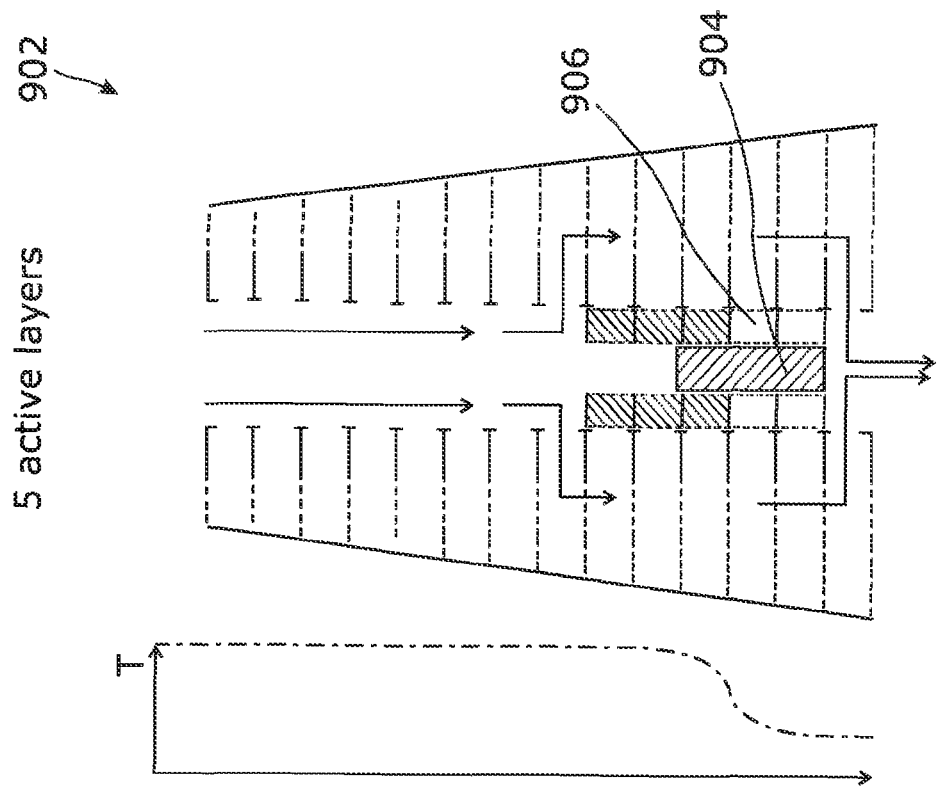
FIGS. 21a and 21b show how a thermal front progresses down a tapered store with a central main flow passageway containing a variable-length moving baffle, according to the fourth aspect.
Figure 21A:
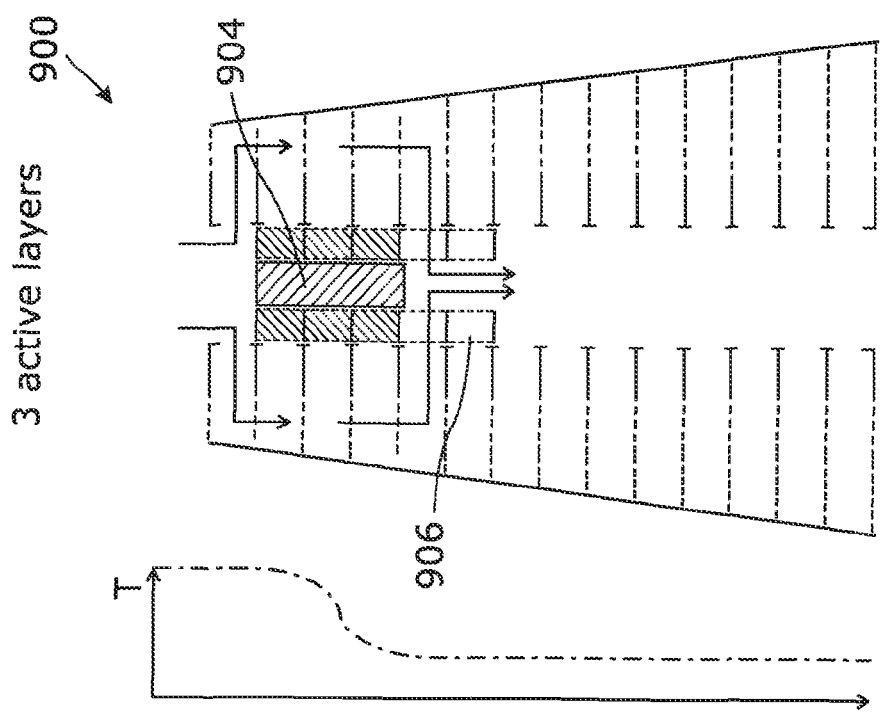

FIGS. 21a and 21b

By contrast, FIGS. 21a and 21b show how a thermal front progresses down a tapered store with a central bypass passageway containing a variable-length moving baffle, which embodiment is within the scope of the fourth aspect of the invention. The tapering of the store reduces the broadening of the thermal front as it moves down the store, thus allowing a more compact variable-length baffle 904/906 to be used. Thus, it will be seen that the front only changes from to 5 layers being active in the stores 900, 902, respectively, as it progresses downstream.

Figure 22B:
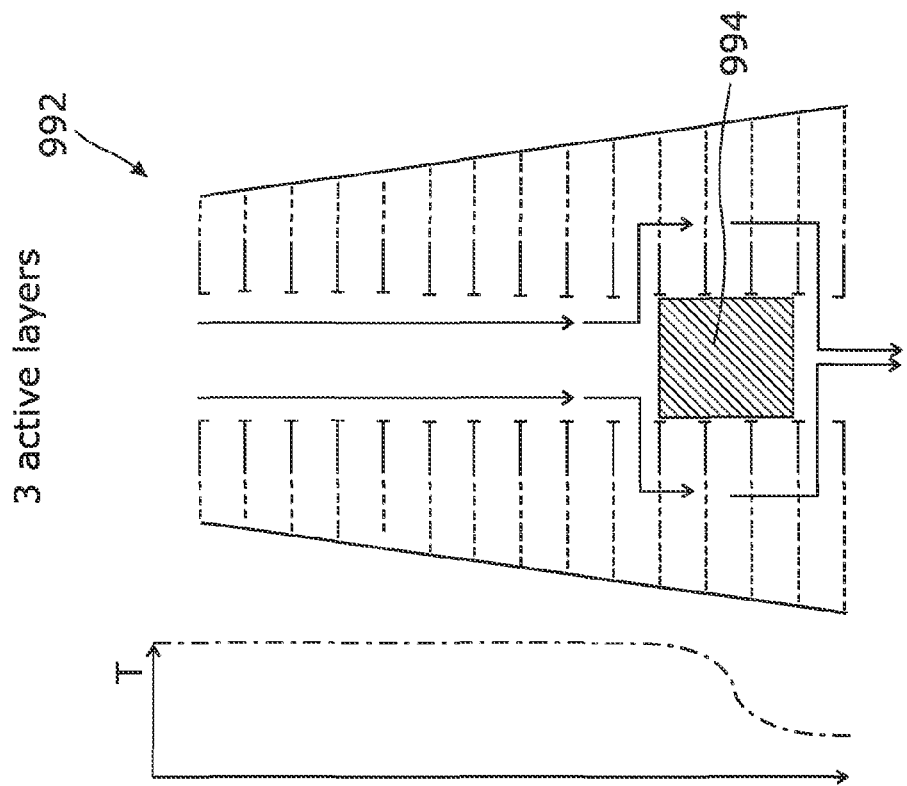
FIGS. 22a and 22b show how a thermal front progresses down a tapered store with a central main flow passageway containing a fixed length moving baffle, according to the fourth aspect.
Figure 22A:
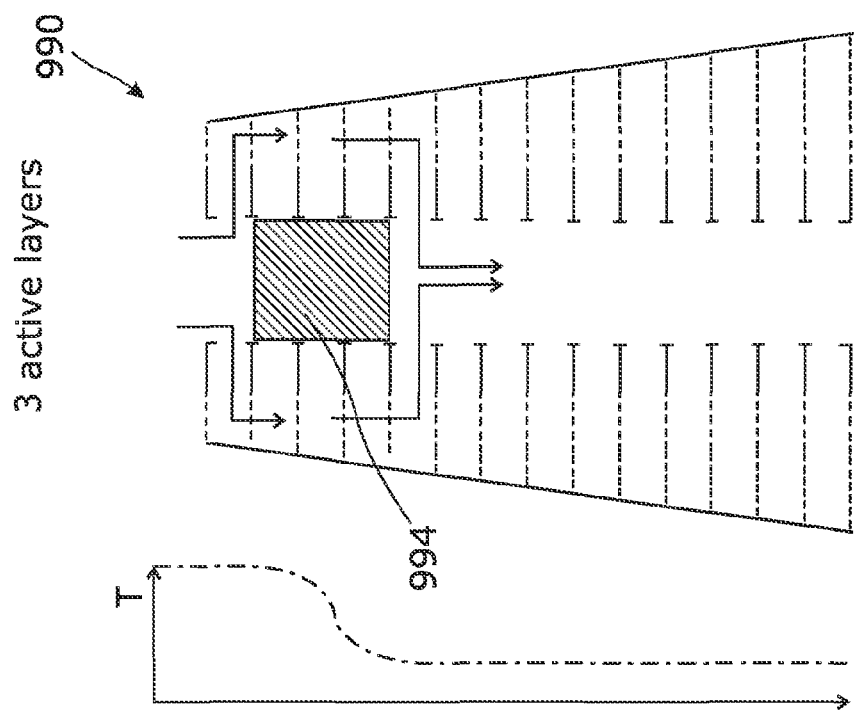

FIGS. 22a and 22b

FIGS. 22a and 22b show how a thermal front progresses down a tapered store with a central bypass passageway containing a fixed length moving baffle, which embodiment is within the scope of the fourth aspect of the invention. The tapering of the store is selected to fully compensate for any front broadening such that the front length remains constant along the length of the store at only 3 active layers (during early charging 990 and later charging 992), thus only requiring the use of a simple, fixed-length baffle 994.

FIGS. 24a to 24c and FIG. 25

Figure 25:
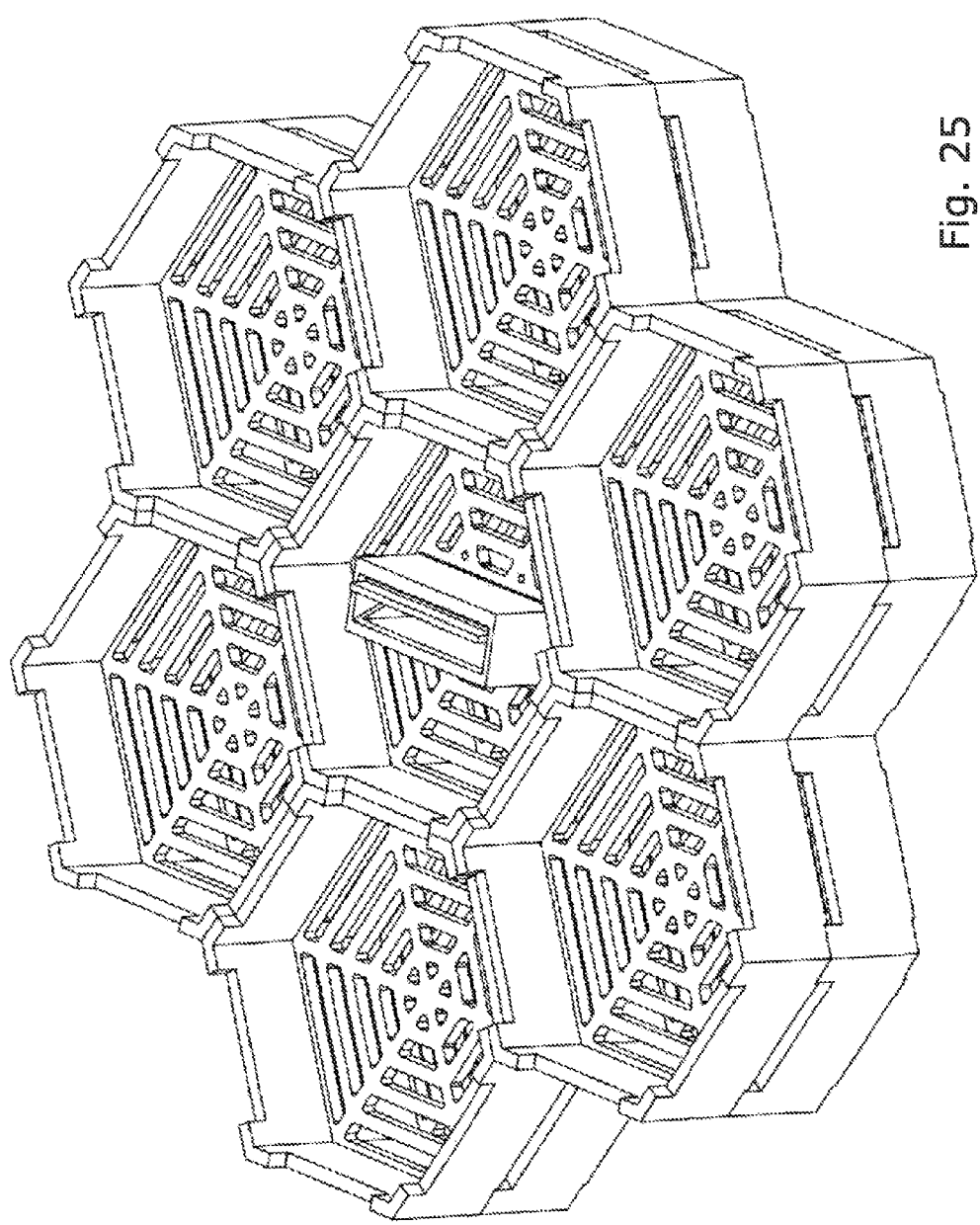
FIG. 25 is a perspective view of several hexagonal trays of FIG. 24 in a tessellating and stacked arrangement, in accordance with the second aspect.

FIGS. 24a, 24b show a single hexagonal tray 430 which may be used to form an alternative layered support assembly according to the second aspect. The tray 430 is a one-piece component that consists of a hexagonal base 431 containing multiple apertures 432 for permitting gas flow, a solid wall 434 running around the periphery of the base to contain the storage media within the tray and strengthen the trays, and raised load bearing supports 433 on the wall at the tray vertices. Recesses 435 in the base of the trays mate with the supports 433 such that multiple trays can be stacked on top of each other in an interlocking arrangement. A single layer can be formed by tessellating multiple trays, as shown in FIG. 25, and further layers can be built up by stacking further trays on top, also shown in FIG. 25. In order to form a valved layer some of the trays 430 may be replaced with valved trays 436, as shown in FIG. 24c, which include a valved opening. The valves may comprise any suitable valve such as, for example, bistable or monostable flap valves (437 and 438 as shown in FIG. 24c) or butterfly valves. Integral interlocking means or separate connector clips, for example, may be provided as interlocking means (not shown) in order to interlock adjacent hexagonal trays 430 together to form a cohesive layer capable of resisting lateral tensile forces.

FIGS. 26a to 26c and FIG. 27

A possible drawback of the walled hexagonal trays 430 and 436 of FIGS. 24a and 24c is the potential for bypass edge flows along the walls and also interlayer vertical bypass flows in between the walls of adjacent trays. This can be negated to some extent by using an alternative tray as shown in FIGS. 26a, 26 and 26c. The trays 440 and 446 still retain a hexagonal base 441 containing multiple apertures 442, but the walls 434 have been removed, except at the tray vertices where they are still required to act as supports. By removing the tray walls, storage media can be placed over the top of the interfaces between adjacent trays, thus cutting out the path for bypass flows between adjacent trays. Recesses 445 are still provided in the bases of the trays to enable vertical stacking of trays and valved trays 446 can also still be created.

Figure 27:
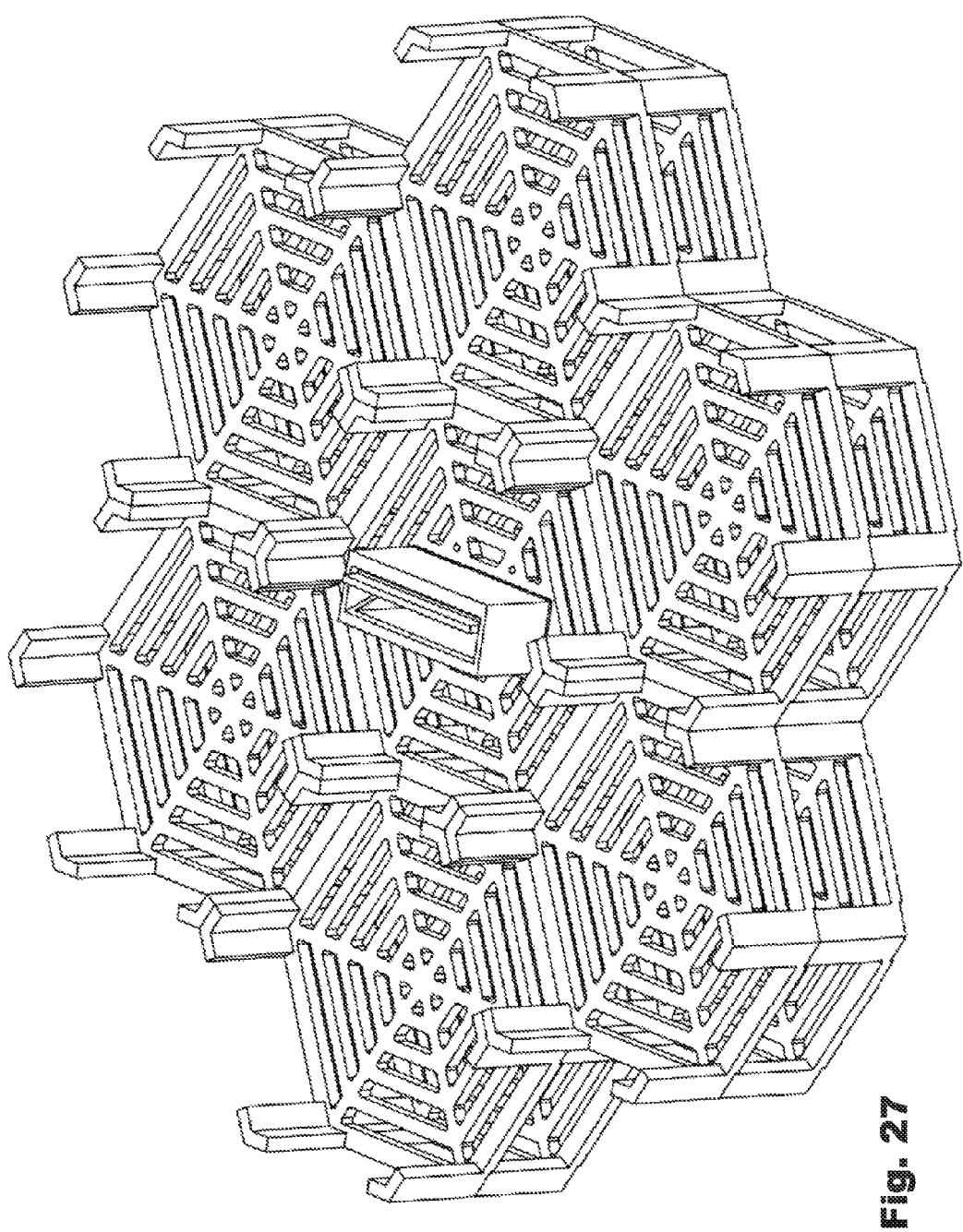

FIG. 27 shows how the trays without walls 440 and 446 can still be tessellated and stacked in the same way as the walled trays of FIG. 25. Again, suitable interlocking means (not shown) could be provided to provide a cohesive layer.

The present invention further provides any novel and inventive combination of the above mentioned features which the skilled person would understand as being capable of being combined.

In particular, as indicated above, features described with respect to one of the four aspects of the invention, may also be used in relation to another aspect, where the use of that feature would clearly not conflict with the teaching of that aspect (even where that combination has not been specifically mentioned).

The invention claimed is:

1. A thermal energy store, comprising:
a chamber having a gas inlet and a gas outlet; and
a plurality of successive, downstream, gas permeable thermal storage layers disposed in series along the chamber between the inlet and the outlet;
each thermal storage layer including gas permeable thermal storage media;
the store being configured for gas flow along the chamber from the gas inlet, in series, through the plurality of thermal storage layers to the gas outlet, for transfer of thermal energy to or from the thermal storage media;
wherein at least one layer of the plurality of thermal storage layers is a valved thermal storage layer having at least one valve operable selectively to allow or prevent at least some gas flow to pass through the valved thermal storage layer via the valve so as to bypass the thermal storage media of the valved thermal storage layer.

2. A thermal energy store according to claim 1, wherein the valved thermal storage layer is provided with a plurality of spaced valves.

3. A thermal energy store according to claim 2, wherein the spaced valves in the valved thermal storage layer are operable independently of those in any other valved thermal storage layer.

4. A thermal energy store according to claim 1 wherein each thermal storage layer of the plurality of thermal storage layers comprises a respective valved thermal storage layer.

5. A thermal energy store according to claim 1, further comprising a control system configured to selectively alter, a flow path of gas flowing from inlet to outlet in response to progress of a thermal front through the store.

6. A thermal energy store according to claim 1, wherein the chamber is an upright chamber comprising a plurality of horizontal gas permeable thermal storage layers arranged above one another in between the gas inlet and the gas outlet such that the store is configured for vertical gas flow from the gas inlet to the gas outlet through the thermal storage layers.

7. A thermal energy store according to claim 6, wherein the store is arranged such that the gas inlet is provided at the top of the chamber when the gas inlet is set up as a hot inlet or at the bottom of the chamber when the gas inlet is set up as a cold inlet.

8. A thermal energy store according to claim 1, further comprising a gap or plenum for lateral gas distribution above the thermal storage media of each thermal storage layer.

9. A thermal energy store according to claim 1, wherein the plurality of thermal storage layers are in the form of a layered support assembly in which the thermal storage media of each layer is supported by the support assembly, and the assembly is constructed such that the thermal storage layers are mounted on top of each other to form a stack.

10. A thermal energy store according to claim 1, wherein the valved thermal storage layer comprises at least one actuating mechanism for the at least one valve arranged above the thermal storage media.

11. A thermal energy store according to claim 9, wherein the valved thermal storage layer comprises at least one actuating mechanism for the at least one valve, which mechanism is housed externally of the support assembly.

12. A thermal energy store according to claim 1, wherein the valved thermal storage layer comprises a plurality of valves operable in unison by a single actuation mechanism.

13. A thermal energy store according to claim 1, wherein the at least one valve comprises a flap valve or a sliding valve.

14. A thermal energy store according to claim 1, wherein the plurality of thermal storage layers comprise adjacent valved thermal storage layers, each adjacent valved thermal storage layer comprising a respective valve, and wherein the respective valves in the adjacent valved layers are vertically aligned to provide bypass passageways extending through the store.

15. An energy storage system, comprising:
one or more thermal energy stores according to claim 1.

16. A pumped heat electricity storage (PHES) system, comprising:
the energy storage system according to claim 15;
a compression stage to compress gas;
a first thermal store to receive and store thermal energy from gas compressed by the compression stage;
an expansion stage to receive gas after exposure to the first thermal store and expanding the gas; and
a second thermal store to transfer thermal energy to gas expanded by the expansion stage.

17. A thermal energy store according to claim 5, wherein the control system is configured to alter the flow path of the gas to bypass the thermal storage media of the thermal storage layers upstream of the thermal front, in which thermal storage layers thermal transfer is substantially complete.

18. A thermal energy store according to claim 5, wherein the control system is configured to alter the flow path of the gas to bypass the thermal storage media of the thermal storage layers downstream of the thermal front, in which thermal storage layers thermal transfer is minimal.

19. A thermal energy store according to claim 5, wherein:
the control system is configured to alter the flow path of the gas to bypass the thermal storage media of the thermal storage layers upstream of the thermal front, in which thermal storage layers thermal transfer is substantially complete; and
the control system is configured to bypass the thermal storage media of the thermal storage layers downstream of the thermal front, in which thermal storage layers the thermal transfer is minimal,
such that the flow path of the gas only passes through the thermal storage media of those thermal storage layers in which all or part of the thermal front exists.

20. A method of operating a thermal energy store that includes:
a chamber having a gas inlet and a gas outlet; and,
a plurality of successive, downstream, gas permeable thermal storage layers disposed in series along the chamber between the inlet and the outlet;
each thermal storage layer including gas permeable thermal storage media;
the store being configured for gas flow along the chamber from the gas inlet, to in series, through the plurality of thermal storage layers to the gas outlet for transfer of thermal energy to or from the thermal storage media;
wherein at lease one layer of the plurality of thermal storage layer is a valved thermal storage layer having at least one valve operable selectively to allow or prevent at least some gas flow to pass through the valved thermal storage layer via the valve so as to bypass the thermal storage media of the valved thermal storage layer; and the method comprising:

directing a gas into the gas inlet of the chamber such that the gas flow, from the gas inlet, in series, through the plurality of thermal storage layers to the gas outlet for transfer of thermal energy to or from the thermal storage media, and such that a thermal front a progresses along the length of the store;

wherein the plurality of thermal storage layers include a plurality of adjacent valved thermal storage layer;

and the gas flow is diverted into the thermal storage media of different selected downstream groups of the adjacent valved thermal storage layers, in turn, at the thermal front moves downstream, by closing the valves of those selected groups of adjacent valved thermal storage layers in turn.

* * * * *